United States Patent
Wei et al.

(10) Patent No.: US 7,068,948 B2
(45) Date of Patent: Jun. 27, 2006

(54) GENERATION OF OPTICAL SIGNALS WITH RETURN-TO-ZERO FORMAT

(75) Inventors: Haiqing Wei, Sunnyvale, CA (US); Aly F. Elrefaie, Cupertino, CA (US); Xin Xue, Sunnyvale, CA (US); Shih-Yuan Wang, Palo Alto, CA (US)

(73) Assignee: Gazillion Bits, Inc., San Jose, CA (US)

( * ) Notice: Subject to any disclaimer, the term of this patent is extended or adjusted under 35 U.S.C. 154(b) by 593 days.

(21) Appl. No.: 09/971,831

(22) Filed: Oct. 4, 2001

(65) Prior Publication Data
US 2002/0196508 A1   Dec. 26, 2002

Related U.S. Application Data

(60) Provisional application No. 60/297,882, filed on Jun. 13, 2001.

(51) Int. Cl.
*H04B 10/04* (2006.01)

(52) U.S. Cl. .................. 398/184; 398/185; 398/188

(58) Field of Classification Search ................ 398/185, 398/98, 154, 184, 188, 1; 385/1; 359/245, 359/279; 341/184, 68; 375/289
See application file for complete search history.

(56) References Cited

U.S. PATENT DOCUMENTS

| | | | |
|---|---|---|---|
| 4,965,857 A | 10/1990 | Auracher et al. | |
| 5,311,351 A | 5/1994 | Chesnoy | |
| 5,432,632 A | 7/1995 | Watanabe | |
| 5,473,458 A | 12/1995 | Mamyshev et al. | |
| 5,477,375 A | 12/1995 | Korotky et al. | |

(Continued)

FOREIGN PATENT DOCUMENTS

| | | |
|---|---|---|
| EP | 0622916 | 2/1994 |
| WO | WO01/04677 | 1/2001 |
| WO | WO01/67165 | 9/2001 |

OTHER PUBLICATIONS

Golovchenko, E., Menyuk, C. et al., "Analysis of Optical Pulse Train Generation Through Filtering of an Externally Phase-Modulated Signal from a CW laser," *Electronics Letters* vol. 31, No. 16 (Aug. 3, 1995).

(Continued)

*Primary Examiner*—David C. Payne
(74) *Attorney, Agent, or Firm*—Cooper & Dunham LLP

(57) ABSTRACT

An optical return-to-zero (RZ) signal generator and related methods are described in which a phase modulator causes a phase change in an optical signal responsive to a transition in a driving signal, and in which an interferometer receives the optical signal from the phase modulator and generates an optical pulse responsive to that phase change. Preferably, the interferometer introduces a fixed, unmodulated time delay between its two signal paths, the fixed time delay being selected such that destructive interference occurs at an output of the interferometer when the phase of the optical signal received from the phase modulator remains constant. However, when a rising or falling edge of the driving signal causes phases changes in the optical signal, the destructive interference at the output of the interferometer is disturbed, and an optical pulse is generated. The driving signal is a differentially encoded version of an input information signal. Alternatively, the driving signal is proportional to the input information signal and the transmitted RZ-formatted optical signal is a differentially encoded version of that signal. Features for regulating the fixed time delay, features for frequency shift compensation, features for loss compensation/equalization, and integrated single-chip and multiple-chip embodiments are also described.

49 Claims, 17 Drawing Sheets

U.S. PATENT DOCUMENTS

| | | |
|---|---|---|
| 5,491,576 A | 2/1996 | Bergano |
| 5,508,845 A | 4/1996 | Frisken |
| 5,521,738 A | 5/1996 | Froberg et al. |
| 5,526,162 A | 6/1996 | Bergano |
| 5,532,857 A | 7/1996 | Gertel et al. |
| 5,594,583 A | 1/1997 | Devaux |
| 5,608,560 A | 3/1997 | Abram et al. |
| 5,625,722 A | 4/1997 | Froberg et al. |
| 5,745,613 A | 4/1998 | Fukuchi et al. |
| 5,786,918 A | 7/1998 | Suzuki et al. |
| 5,828,478 A | 10/1998 | Thomine et al. |
| 5,907,421 A | 5/1999 | Warren et al. |
| 6,005,702 A | 12/1999 | Suzuki et al. |
| 6,046,838 A | 4/2000 | Kou et al. |
| 6,072,615 A | 6/2000 | Mamyshev |
| 6,091,535 A | 7/2000 | Satoh |
| 6,097,525 A | 8/2000 | Ono et al. |
| 2003/0007231 A1 | 1/2003 | Winzer |

OTHER PUBLICATIONS

Griffin, R.A. et. al., "Integrated 10 Gb/s Chirped Return-to-Zero Transmitter Using GaAs/AlGaAs Modulators," Optical Society of America PD15-1 to PD15-3 (2000).

Hecht, J., *Understanding Fiber Optics*, 3$^{rd}$ ed., Prentice-Hall (1999) at pp. 375-380.

Ohhira, R., Ogasahara, D., Ono, T., "Novel RZ Signal Format with Alternate-Chirp for Suppression of Nonlinear Degradation in 40 Gb/s Based WDM," Optical Fiber Communication (OFC) Conference 2001, Paper #WM2, Anaheim, California (Mar. 17-22, 2001).

Ougazzaden, A., et al., "40Gb/s tandem electro-absorption modulator," Optical Fiber Communication Conference and Exhibit, pp. PD14-1 to PD14-3, Optical Society of America, Anaheim, California (Mar. 17-22, 2001).

U.S. Appl. No. 09/972,146, filed Oct. 4, 2001.

Miyamoto, Y. et. al., "S-band 3×120-km DSF transmission of 8×42.7-Gbit/s DWDM duobinary-carrier-suppressed RZ Signals generated by novel wideband PM/AM conversion," Proc. Optical Amplifiers and their Applications (OAA 2001), Postdeadline paper PD6.

Optimight Communications, Inc., "Introducing the OMC 1600™ Optical Transport System—Experience the Optimight Difference: Catalyst for the Bandwith Revolution," 4-page brochure downloaded on Dec. 13, 2001 from www.optimight.com/products/omc1600_brochure.pdf.

Optimight Communications, Inc., "OMC 1600™ Core Optical Transport System Data Sheet—Optimight Communications OMC 1600", 2-page brochure downloaded on Dec. 13, 2001 from "www.optimight.com/products/OMC 1600 Data Sheet 5[1].24.01.pdf."

Winzer, P. and Leuthold, J., "Return-to-Zero Modulator Using a Single NRZ Drive Signal and an Optical Delay Interferometer," IEEE Photonics Technology Letters, publication pending, Publisher Item Identifier S 1041-1135(01)09971-2.

GENERATION OF OPTICAL SIGNALS WITH RETURN-TO-ZERO FORMAT

CROSS-REFERENCE TO RELATED APPLICATIONS

This application claims the benefit of U.S. Provisional App. No. 60/297,882, filed Jun. 13, 2001, which is incorporated by reference herein.

FIELD

This patent specification relates to optical fiber communications systems. More particularly, it relates to a method and system for generating a high bit-rate optical signal having a return-to-zero (RZ) format.

BACKGROUND

As the world's need for communication capacity continues to increase, the use of optical signals to transfer large amounts of information has become increasingly favored over other schemes such as those using twisted copper wires, coaxial cables, or microwave links. Optical communication systems use optical signals to carry information at high speeds over an optical path such as an optical fiber. Optical fiber communication systems are generally immune to electromagnetic interference effects, unlike the other schemes listed above. Furthermore, the silica glass fibers used in fiber optic communication systems are lightweight, comparatively low cost, and are able to carry tens, hundreds, and even thousands of gigabits per second across substantial distances.

FIG. 1 illustrates an example of a non-return-to-zero (NRZ) formatted optical signal, a return-to-zero (RZ) formatted signal, and a modulated soliton pulse train. As described in Hecht, *Understanding Fiber Optics*, 3$^{rd}$ ed., Prentice-Hall (1999), which is incorporated by reference herein, at pp. 375–380, NRZ coding is probably the most common format in fiber optic communications systems. As described in Hecht, supra, solitons are optical pulses that naturally retain their shape as they travel along an optical fiber. This is basically due to a delicate balancing act between two competing effects that degrade the transmission of other pulses, in particular, (i) chromatic dispersion, which stretches out pulses carrying a range of wavelengths as they travel along a fiber, and (ii) self-phase modulation, which spreads out the range of wavelengths as pulses pass through an optical fiber.

Soliton pulses have proved surprisingly robust in optical fibers. In a long-haul wavelength division multiplexed (WDM) optical communications system, this robustness allows for increased signal power and reduced spacing among optical amplifiers and/or regenerative repeaters. The input pulses themselves do not necessarily have to match the ideal soliton shape exactly, because fiber transmission gives them the proper soliton shape. Thus, the transmission of RZ pulses, also shown in FIG. 1, can often results in soliton propagation along the optical fiber. Even if not resulting in an ideal match to soliton propagation, the RZ pulses nevertheless generally experience improved robustness as compared to NRZ formatted optical signals.

Optical RZ transmitters, also termed optical RZ signal generators, have been developed for the purpose of receiving an electrical information signal at R bits/sec (period=T=1/R sec) and generating a corresponding optical signal modulated with an RZ-formatted envelope. The input electrical signal is most commonly provided in NRZ format. For a typical RZ transmitter, the output optical signal has a carrier frequency $f_c$ and free-space carrier wavelength $\lambda_c=c/f_c$ in an infrared region appropriate for optical communications, e.g., $f_c \approx 196.08$ THz/$\lambda_c=1530$ nm. Modulation rates R for commercially available RZ transmitters are generally limited to R=10 Gbps (T=100 ps) or slower, although some systems with modulation rates up to 40 Gbps (T=25 ps) have been proposed.

FIG. 2 illustrates an RZ signal generator 202 in accordance with a prior art configuration that uses two amplitude modulators (AMs). RZ signal generator 202 comprises a first AM 204, a second AM 206, and a continuous wave (CW) laser 203 coupled as shown in FIG. 2. First AM 204 receives an optical carrier signal at frequency $f_c$ from CW laser 203. First AM 204 comprises a Mach-Zehnder interferometer (MZI) having a first path 208 and a second path 209, the first path 208 having no phase modulator and the second path 209 having phase modulator 210 that introduces a phase shift $\theta$. At an output 211, the first AM 204 is designed to provide the difference between the signals present on the first path 208 and the second path 209. The phase shift $\theta$ is modulated by a sinusoidal electrical signal $V_1$ provided by a sinusoidal signal generator 218 having a frequency equal to the desired modulation rate R=1/T, according to the relationship $\theta=\pi V_1/V_\pi$, where $V_\pi$ is a fixed value. As known in the art, the fixed value $V_\pi$ is determined by the nature and amount of variable-refractive-index material used in the phase modulator 210. Generally speaking, when $V_1$ equals 0 there is a "zero" phase shift (compared to an arbitrary reference value), and when $V_1$ equals $V_\pi$, there is a $\pi$ phase shift (compared to that reference value).

Included in FIG. 2 is a plot 205 of the output optical power $P_1$ versus input electrical voltage $V_1$ for the first AM 204 when the input signal is an optical carrier signal at $f_c$. When the input signal $V_1$ is at zero, the optical signals on the first path 208 and second path 209 are identical and therefore the output power $P_1$ is zero. When the input signal $V_1$ approaches $V_\pi$, these signals have a $\pi$ phase difference and therefore the output power $P_1$ is a maximum. Shown in FIG. 2 are time plots of the signal $V_1$ and output power $P_1$, indicating a string of narrowed optical pulses of period T being provided to the second AM 206. The second AM 206 is similar to the first AM 204, comprising a first signal path 212 and a phase modulator 214 along a second path introducing a phase shift $\theta$ that is a similar function of voltage applied as the phase modulator 210 of first AM 204. The second AM 206 receives an electrical NRZ data signal (e.g., 1101) having a magnitude normalized to $V_\pi$. The second AM 206 simply serves as a gate for the optical pulses provided by the first AM 204, allowing a pulse to pass through when the NRZ data is a "1" and causing a zero output when the NRZ data is a "0". FIG. 2 also includes plots of the NRZ data signals and the resulting output signal $P_{OUT}$.

The RZ signal generator 202 of FIG. 2 has one or more shortcomings that can reduce its effectiveness, especially at higher modulation rates above 10 Gbps. In particular, the pulse width of the output signal, measured as the time difference between successive points of 50% power (−3 dB) relative to the maximum of the pulse, is generally between 0.45 T and 0.5 T. The pulse width can be narrowed somewhat by adjusting the specific bias point of the first AM 204, i.e., the DC value of $V_1$ in FIG. 2, or by judiciously adjusting the amplitude of the sinusoidal component of $V_1$. Disadvantageously, however, output power levels are reduced as a result of such manipulations. Furthermore, the pulse width generally cannot be made narrower than approximately 0.42

T regardless of the output power levels. Another disadvantage is that the extinction ratio of the RZ signal generator 202, defined as the ratio between the maximum output signal power (during a "1") and the minimum output signal power (during a "0"), will suffer substantially if the amplitude of either AM driving voltage deviates from $V_\pi$. This is because, during intended "off" or zero-power intervals, the phase differences in the arms of the AMs will deviate from $\pi$ when the voltage amplitude deviates from a zero-transmission bias point, causing unwanted non-zero output power levels during these intervals. Another disadvantage is that two amplitude modulators (AMs) are required in the RZ signal generator 202 of FIG. 2. This brings about increased system cost and complexity, each AM requiring a finely biased and electronically controlled delay element as well as a precise signal coupler.

The RZ signal generator 202 produces an output signal in which the instantaneous optical frequency $f_{inst}$ deviates from the nominal optical frequency $f_c$. It can be shown that the frequency shift generated by the RZ signal generator 202 can be expressed as $f_{inst}-f_c=(-\pi/4)(R)\sin(2\pi Rt)$. Thus, for a 10 Gbps modulation rate, the amount of frequency shift varies sinusoidally between peaks of +/−7.85 GHz.

FIG. 3 shows an RZ signal generator 302 in accordance with a prior art configuration similar to one discussed in U.S. Pat. No. 5,625,722. RZ signal generator 302 comprises an amplitude modulator (AM) 304 having a first path 307 and a second path 310, a phase shifting element 308 being placed along the first path 307 and a phase shifting element 312 being placed along the second path 310. The AM 304 receives an optical carrier signal at frequency $f_c$ from a continuous wave (CW) laser 306. The phase shifting elements 308 and 312 are symmetric with respect to each other around a bias phase shift, such that the phase shift element 308 advances the phase of the optical signal by $\theta_1=\pi V_1/V_\pi$ with respect to the bias phase shift when provided with a voltage $V_1$, and such that the phase shift element 312 retards the phase of the optical signal by that same amount when provided with the opposite voltage. Included in FIG. 3 is the resulting plot 305 of the output optical power $P_{OUT}$ versus input electrical voltage $V_1$ for the AM 304 when the input optical signal is a carrier at $f_c$.

RZ signal generator 302 further comprises a differential encoder 314 for receiving the NRZ data signal and generating the input voltage $V_1$ therefrom, and further comprises an inverter 316 for supplying $(-V_1)$ to the AM 304. The input voltage $V_1$ is normalized to the $V_\pi$ of the AM 304. As known in the art, differential encoder 314 is a binary state machine that (i) keeps its output the same when the input is a "0", and (ii) flips its output (0→1 or 1→0) when the input is a "1." Included in FIG. 3 are plots of an exemplary NRZ data signal (011011), the corresponding voltage $V_1$, and the corresponding NRZ envelope $P_{OUT}$ of the output optical signal. As indicated in FIG. 3, the RZ signal generator 302 operates by causing a level shift in $V_1$ whenever the input data is a "1." As indicated by the plot 305 of the operating characteristic of AM 304, the output power is zero when the voltage $V_1$ is at 0 or $V_\pi$, but passes through a maximum when the voltage $V_1$ transitions between these endpoints. Thus, when the input data is a "1" the voltage $V_1$ will transition between endpoints, causing an optical pulse to be emitted. However, when the input data is a "0" there will be no transition in $V_1$ and no optical pulse. It should be noted that the signal $V_1$ will have either the curve labeled "A" or "B" in FIG. 3 depending on an initial state of the differential encoder 314, but that initial state will be irrelevant to the presence or absence of an optical pulse at the output of AM 304, which will only depend on the current value of the NRZ data stream. The RZ signal generator 302 induces no frequency shift in the optical output signal because the delay elements of the AM are symmetric with respect to each other.

The RZ signal generator 302 of FIG. 3 has one or more shortcomings that can reduce its effectiveness, especially at higher modulation rates equal to and above 10 Gbps. Although the optical pulse width can be substantially narrower than those of FIG. 2, this pulse width is a direct function of the rise time and fall time of the electrical signal $V_1$ being provided to the AM 304. In many practical implementations, the rise and fall times of the electrical signals driving the AM 304 can be substantially different from each other, and can vary with time, temperature, or other operating conditions. This causes instability in the output pulse energies, which depend directly on these rise and fall times. For example, if the electrical rise time is a first percentage greater than the electrical fall time, then the pulse energy of adjacent optical pulses will also differ by that first percentage, which is an undesirable result. Also, if the rise and fall times vary by a second percentage due to changes in temperature or other operating condition, then the output pulse energy will also change by that second percentage, which is an undesirable result. These instabilities become increasingly problematic at high modulation rates above 10 Gbps, where these rise and fall time variations can become increasingly prominent. Another disadvantage is that the extinction ratio of the RZ signal generator 302 will also suffer substantially if the amplitude of the driving voltage $V_1$ deviates from $V_\pi$. This is because, during intended "off" or zero-power intervals, the phase difference in the arms of the AM 304 will deviate from $\pi$ when the amplitude of $V_1$ deviates from $V_\pi$, causing unwanted non-zero output power levels during these intervals. Stated another way, with reference to plot 305 of FIG. 3, the voltage $V_1$ must be maintained very close to 0 or very close to $V_\pi$ or there will be non-zero output power $P_{OUT}$ during intended "off" intervals.

Accordingly, it would be desirable to provide an optical RZ signal generator capable of generating a reliable stream of RZ optical pulses corresponding to an electrical information signal.

It would be further desirable to provide an optical RZ signal generator that can provide narrow optical pulses having increased pulse width stability.

It would be still further desirable to provide an optical RZ signal generator that is cost-effective in terms of the number of high-cost precision components required.

It would be even further desirable to provide an optical RZ signal generator in which the pulse width can be adjustable, either at the factory or dynamically during operation.

It would be even further desirable to provide an optical RZ signal generator in which the extinction ratio of the output optical signal has increased stability with respect to variations in the amplitude of the electrical signals driving its electro-optical components.

It would be still further desirable to provide an optical RZ signal generator that is readily amenable to single-chip integration, dual-chip integration, and/or integration with downstream optical components such as optical amplifiers or optical attenuators.

It would be even further desirable to provide a system and method for integrating a plurality of optical components including interferometers onto smaller substrate areas.

SUMMARY

An optical return-to-zero (RZ) signal generator and related methods are provided for receiving an information signal and generating RZ optical pulses corresponding thereto, the optical RZ signal generator comprising a phase modulator for causing a phase change in an optical signal responsive to a transition in a driving signal derived from the information signal, the optical RZ signal generator further comprising an interferometer for receiving the optical signal from the phase modulator and generating an optical pulse responsive to the phase change. According to a preferred embodiment, the interferometer is unmodulated and introduces a fixed time delay between first and second signal paths thereof, the fixed time delay being selected such that destructive interference occurs at an output of the interferometer when the phase of the optical signal received from the phase modulator remains constant. However, when a rising or falling edge of the driving signal causes phases changes in the optical signal, the destructive interference at the output of the interferometer is disturbed, and an optical pulse is generated. The optical pulse has an amplitude corresponding to a rate of change of the phase of the optical signal received from the phase modulator as approximated over the fixed time delay of the interferometer. Accordingly, the total width of the optical pulse generated is the sum of the fixed time delay of the interferometer and the rise or fall time of the driving signal, with the −3 dB width of the optical pulse being substantially less than the total width.

According to a preferred embodiment, the information signal is an electrical signal in NRZ format, and the driving signal is a differentially encoded version of the information signal. In this case, the transmitted optical signal has a binary pattern equal to a binary pattern of the information signal. In another preferred embodiment, the driving signal is directly proportional to the information signal, and the transmitted optical pulse stream has a binary pattern that is a differentially encoded version of the binary pattern of the information signal. In this case, differential encoding is performed at a receiving end of a fiber span carrying the transmitted optical signal. Preferably, the fixed time delay of the interferometer is comparable to the rise/fall time of the driving signal. Channels of a wavelength division multiplexed (WDM) signal may each be separately modulated by individual optical RZ signal generators according to the preferred embodiments and multiplexed together onto a common signal. Optionally, the multiple RZ signal generators may share a common interferometer having a fixed time delay meeting the interference criteria for each channel.

The optical RZ signal generator preferably should have a fixed time delay in the interferometer arm that is precisely maintained, and/or a precisely maintained carrier frequency, such that a time delay-carrier frequency product is precisely maintained. According to a preferred embodiment, a feedback control circuit is used to regulate the fixed time delay and/or carrier frequency. The feedback control system may regulate these parameters based on signals received from an output signal of the interferometer and/or based on a separate pilot carrier beam propagated through the interferometer.

According to a preferred embodiment, a compensating phase modulator may be provided at the output of the interferometer to compensate for frequency shifts in the optical signal. The compensating phase modulator is driven by a compensating signal created by inverting the driving signal and adding a delayed version of the inverted driving signal to itself, the delay amount being substantially equal to the fixed time delay of the interferometer. The compensating phase modulator thereby imposes a frequency shift that is opposite in sign and substantially equal in magnitude to the frequency shift of the optical signal as it left the interferometer, resulting in an output optical signal that is substantially free of frequency shift.

An optical RZ signal generator in accordance with the preferred embodiments is highly amenable to chip-level integration. In one preferred embodiment, both phase modulators and the interferometer are integrated onto a single lithium niobate substrate, while in another preferred embodiment these elements are integrated onto a single semiconductor substrate such as GaAs or InP. Optionally, a variable optical attenuator/amplifier may be included on the semiconductor substrate for loss compensation and/or signal equalization purposes. Optionally, the optical waveguides between successive components may be folded over to reduce the amount of substrate required. Optionally, the interferometer may comprise a Michelson interferometer with differing arm lengths to provide a folded optical path, thereby reducing the amount of substrate required.

Advantages of an optical RZ signal generator according to the preferred embodiments include stable optical pulse widths, narrow optical pulse widths, and high extinction ratios. Other advantages include reduced fabrication costs and modest power requirements, as the device is highly amenable to chip-level integration and has very few (e.g., one or two) electro-optically modulated elements.

DETAILED DESCRIPTION

Figure 4:
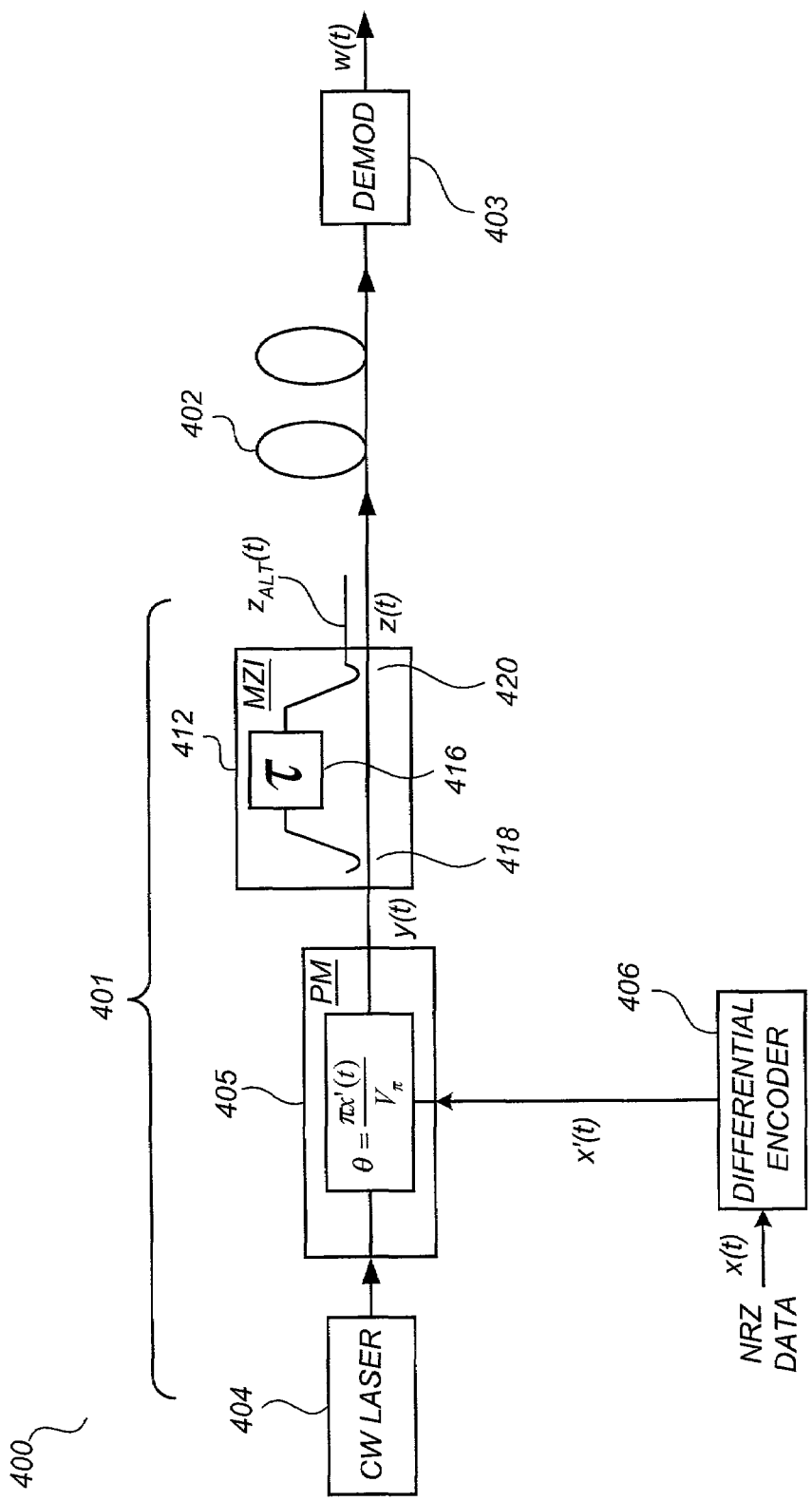
FIG. 4 illustrates an optical RZ signal generator in accordance with a preferred embodiment.

FIG. 4 illustrates an optical communications link 400 comprising an RZ signal generator 401 in accordance with a preferred embodiment. For clarity of disclosure, the optical communications link 400 and RZ signal generator 401 are described with respect to a single optical channel having a center wavelength $\lambda_c$ (center frequency $f_c$). By way of example and not by way of limitation, the optical channel at $\lambda_c$ may have a typical WDM carrier wavelength $\lambda_c$ of 1550 nm ($f_c$ of about 193.5 THz), and may have a desired modulation rate R of 40 Gbps. Optical communications link 400 further comprises a fiber span 402 that may include one or more repeaters and/or regenerators (not shown) as required to transmit the optical signal to a receiver portion 403. RZ signal generator 401 comprises a continuous wave (CW) carrier source 404, such as a laser, that generates an optical carrier signal according to Eq. (1) below:

$$\text{carrier}(t) = \cos(2\pi f_c t) \quad \{1\}$$

For clarity of disclosure, it is presumed herein that the optical carrier signal emitted by CW laser 404 has an amplitude normalized to 1. RZ signal generator 401 further comprises a phase modulator 405, a differential encoder 406, and an interferometer 412 coupled as illustrated in FIG. 4. Signal generator 401 receives an electrical input signal x(t), an NRZ signal representing the data to be encoded onto the carrier and having an exemplary bit rate R of 40 Gbps (corresponding to a period T of 25 ps per bit). While the electrical input data signal x(t) is presumed herein to be an NRZ signal for clarity of disclosure, it is to be appreciated that the RZ signal generator 401 could be readily adapted to receive the electrical input in RZ format or other formats. Differential encoder 406 is a binary state machine that keeps its output the same when the input is a "0" and that toggles its output when the input is a "1." In one preferred embodiment, differential encoder 406 comprises an exclusive-or (XOR) gate and a feedback loop having a delay of T, i.e., the bit period of the electrical input signal x(t). However, other configurations can be used for differential encoding as described further infra. An output x'(t) of the differential encoder 406 is provided to the phase modulator 405.

Figure 5:
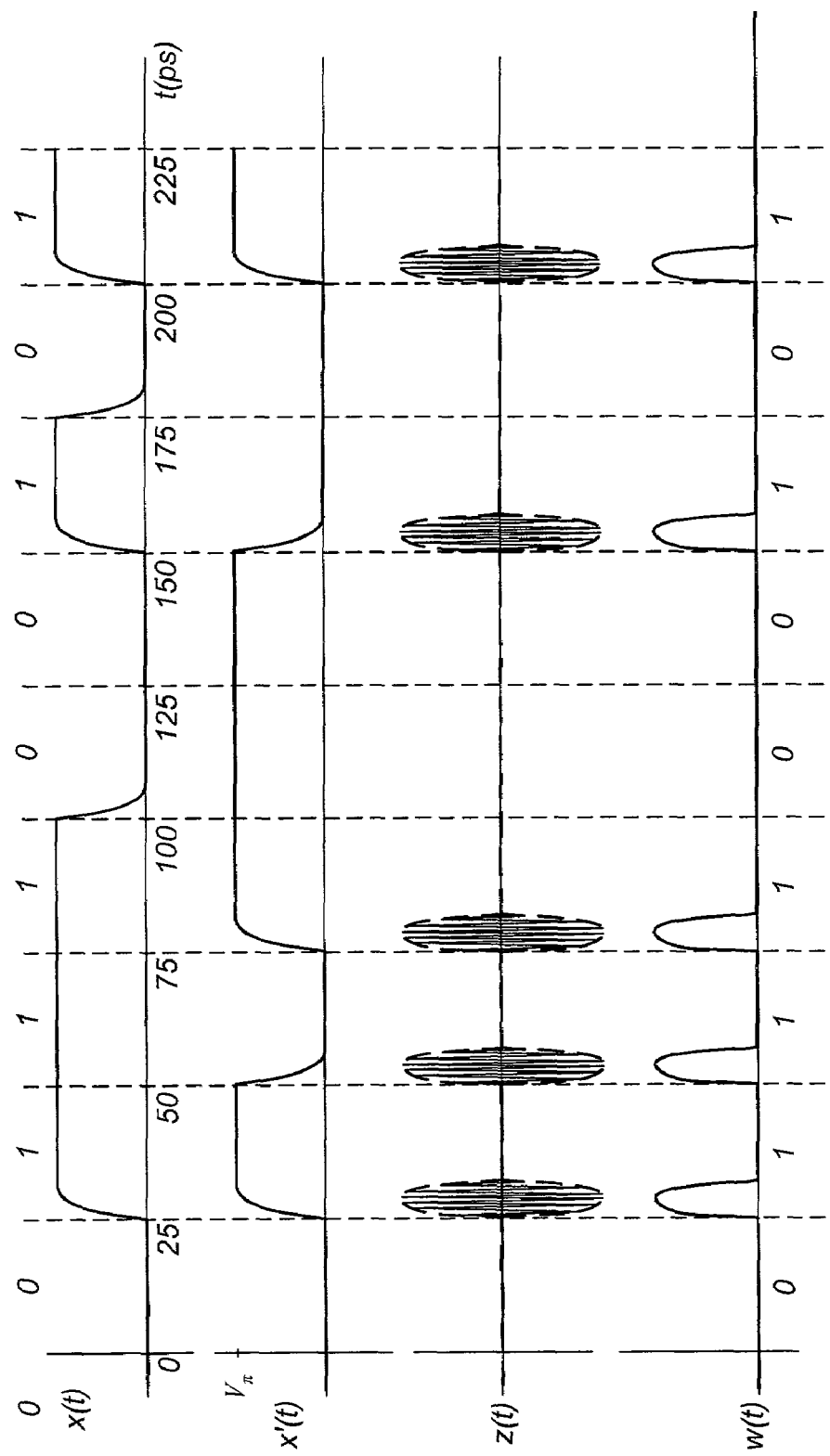
FIG. 5 illustrates exemplary waveforms corresponding to selected locations of the system of FIG. 4.

FIG. 5 illustrates exemplary waveforms corresponding to selected locations of the system of FIG. 4, beginning with the NRZ signal x(t) carrying an exemplary bit stream portion "011100101." Importantly, FIG. 5 illustrates the signal x(t) in a real-world representation in having a finite rise and fall time. By way of example, the rise and fall times are shown as being approximately 5 ps, although the preferred embodiments are applicable to a variety of real-world input signals x(t) having different rise and fall times. Also illustrated in FIG. 5 is a real-world representation of the signal x'(t) output from the differential encoder 406. Importantly, the signal x'(t) will change its state (i.e., transition from OFF→ON or ON→OFF) when the input signal x(t) is a "1", but will not change its state when the input signal x(t) is a "0". Like all real-world signals, x'(t) has a finite rise time $t_{rise}$ and a finite fall time $t_{fall}$. As described below, it is state transitions of the differential encoder output x'(t) over time intervals $t_{rise}$ and $t_{fall}$ that trigger the formation of optical pulses from the RZ signal generator 401. Advantageously, in the preferred embodiment of FIG. 4, the durations of the rise and fall times $t_{rise}$ and $t_{fall}$ are not associated with externally provided signals, but rather are associated with the hardware of the differential encoder 405 that produces x'(t). In this sense, the rise and fall times $t_{rise}$ and $t_{fall}$ are more controllable by the manufacturer of the RZ signal generator than if the signal x'(t) was provided from external electrical sources. As described infra, the rise and fall times $t_{rise}$ and $t_{fall}$ contribute to the width of the emitted optical pulses although, advantageously, they are not the sole determining factors of the emitted pulse width. By way of example, the rise and fall times $t_{rise}$ and $t_{fall}$ may be each maintained at about 5 ps, although the preferred embodiments are applicable to a variety of different rise and fall times.

Phase modulator 405 comprises a phase shift element having a differential delay that is proportional to the electrical input signal x'(t), thereby causing a differential phase shift that is proportional to the electrical input signal x'(t) over the wavelengths of interest. By way of example, the delay element may comprise a substrate material such as lithium niobate (LiNbO$_3$) whose index of refraction can vary with applied voltage. As known in the art, the phase modulator 405 has a characteristic parameter $V_\pi$ corresponding to the voltage for which it induces a phase shift of $\pi$ radians for a carrier beam of a specified frequency $f_c$. For a typical lithium niobate phase modulator, $V_\pi$ is approximately 5 volts. However, $V_\pi$ can be as low as 1 volt for some phase modulators such as those based on indium phosphide (InP) substrates. Phase modulator 405 receives the carrier signal of Eq. (1) and modulates it with the differentially encoded signal x'(t) to produce an output y(t) according to Eq. (2) below.

$$y(t) = \cos(2\pi f_c t - \theta) = \cos(2\pi f_c t - ax'(t)) = \cos\left(2\pi f_c t - \pi \frac{x'(t)}{V_\pi}\right) \quad \{2\}$$

In Eq. (2), the value "a" represents an efficiency metric of the phase modulator 405 which, in accordance with a preferred embodiment, is selected such that ax'(t)=π when x'(t) is equal to $V_\pi$, i.e., $a = \pi/V_\pi$. Accordingly, when x'(t) is zero, optical signal y(t) has a phase lag of zero, and when x'(t) is $V_\pi$, optical signal y(t) has a phase lag of π.

Interferometer 412 comprises first and second couplers 418 and 420 and a delay element 416 having an optical delay of τ. The amount of optical delay τ is judiciously selected according to a first set of criteria for generation of RZ formatted signals as described herein. Generally, for the generation of RZ formatted signals, the optical delay τ is a fraction of the bit period T. As known in the art, the interferometer 412 will generate a first output z(t) according to Eq. (3) below, and a second output $Z_{ALT}(t)$ according to Eq. (4) below:

$$z(t) = y(t) - y(t-\tau) = \quad \{3\}$$
$$\frac{1}{2}\cos\left(2\pi f_c t - \pi \frac{x'(t)}{V_\pi}\right) - \frac{1}{2}\cos\left(2\pi f_c t - 2\pi f_c \tau - \pi \frac{x'(t-\tau)}{V_\pi}\right)$$

$$z_{ALT}(t) = y(t) + y(t-\tau) = \quad \{4\}$$
$$\frac{1}{2}\cos\left(2\pi f_c t - \pi \frac{x'(t)}{V_\pi}\right) + \frac{1}{2}\cos\left(2\pi f_c t - 2\pi f_c \tau - \pi \frac{x'(t-\tau)}{V_\pi}\right)$$

Of course, Eq. (4) above may be recast as Eq. (5) below:

$$z_{ALT}(t) = y(t) + y(t-\tau) = \frac{1}{2}\cos\left(2\pi f_c t - \pi\frac{x'(t)}{V_\pi}\right) - \frac{1}{2}\cos\left(2\pi f_c t - [2\pi f_c \tau - \pi] - \pi\frac{x'(t-\tau)}{V_\pi}\right) \quad \{5\}$$

For the preferred embodiment of FIG. 4 in which the output z(t) of interferometer 412 is used, one criteria for the delay value τ is given by Eqs. (6)–(7) below:

$$2\pi f_c \tau = 2\pi m, \text{ or} \quad \{6\}$$

$$\tau = (1/f_c)m = (\lambda_c/c)m \quad \{7\}$$

In Eq. {7}, "c" is the speed of light and "m" is a positive integer. For an alternative preferred embodiment in which the output $z_{ALT}(t)$ of interferometer 412 is used, the criteria for the delay value τ is given by Eqs. (8)–(9) below:

$$2\pi f_c \tau - \pi = 2\pi m, \text{ or} \quad \{8\}$$

$$\tau = (1/f_c)(m+\frac{1}{2}) = (\lambda_c/v)(m+\frac{1}{2}) \quad \{9\}$$

If the criterion of Eq. (7) is satisfied for the preferred embodiment of FIG. 4 (or the criterion of Eq. (9) is satisfied if $z_{ALT}(t)$ is used instead of z(t)), then the equation for the signal transmitted for either case is given by Eq. (10) below:

$$z(t) = \frac{1}{2}\cos\left(2\pi f_c t - \pi\frac{x'(t)}{V_\pi}\right) - \frac{1}{2}\cos\left(2\pi f_c t - \pi\frac{x'(t-\tau)}{V_\pi}\right) \quad \{10\}$$

This expression for the transmitted optical signal z(t) can be recast into carrier-envelope form using trigonometric identities, resulting in Eq. (11) below:

$$z(t) = \sin\left(2\pi f_c t - \pi\frac{x'(t)+x'(t-\tau)}{2V_\pi}\right)\sin\left(\pi\frac{x'(t)-x'(t-\tau)}{2V_\pi}\right) \quad \{11\}$$

Thus, when the condition of Eq. (7) is satisfied, it is readily seen from Eq. (11) that the signal transmitted across fiber span 402 is simply an optical carrier at $f_c$ having an envelope of $\sin\{\pi[x'(t)-x'(t-\tau)]/2V_\pi\}$. In particular, when x'(t) is driven at voltages for which the envelope sine term is a monotonic function (e.g., when x'(t) remains between zero and $V_\pi$), the carrier envelope magnitude roughly corresponds to the derivative of x'(t) approximated over an interval of τ. Accordingly, any transition in x'(t) (OFF→ON or ON→OFF), which in turn corresponds to an input data value x(t)=1, will cause an optical pulse to be transmitted. In contrast, if there is no transition in x'(t), which in turn corresponds to an input data value x(t)=0, there will be no optical pulse transmitted. The total duration of the emitted optical pulse is $(\tau+t_{rise})$ when x'(t) rises from OFF to ON, and is $(\tau+t_{fall})$ when x'(t) falls from ON to OFF. Defining a total pulse width as the time difference between points of 5% maximum power for a given pulse, it is readily seen that the total pulse width continually alternates between approximately $(\tau+t_{rise})$ and approximately $(\tau+t_{fall})$.

FIG. 5 further illustrates a conceptual example in that there are transmitted signal z(t), which is exaggerated in that there are actually tens of thousands of optical signal cycles at $f_c$ within a given period T of the signal x'(t). As indicated in FIG. 5, the signal z(t) is simply a light beam at $f_c$ modulated by an approximate derivative of the signal x'(t) (scaled by τ), and corresponds to an RZ-modulated version of the original input bit stream x(t). When demodulated by any suitable demodulator 403, the resulting signal w(t) has the same bit pattern as the original binary signal x(t).

Figure 1:
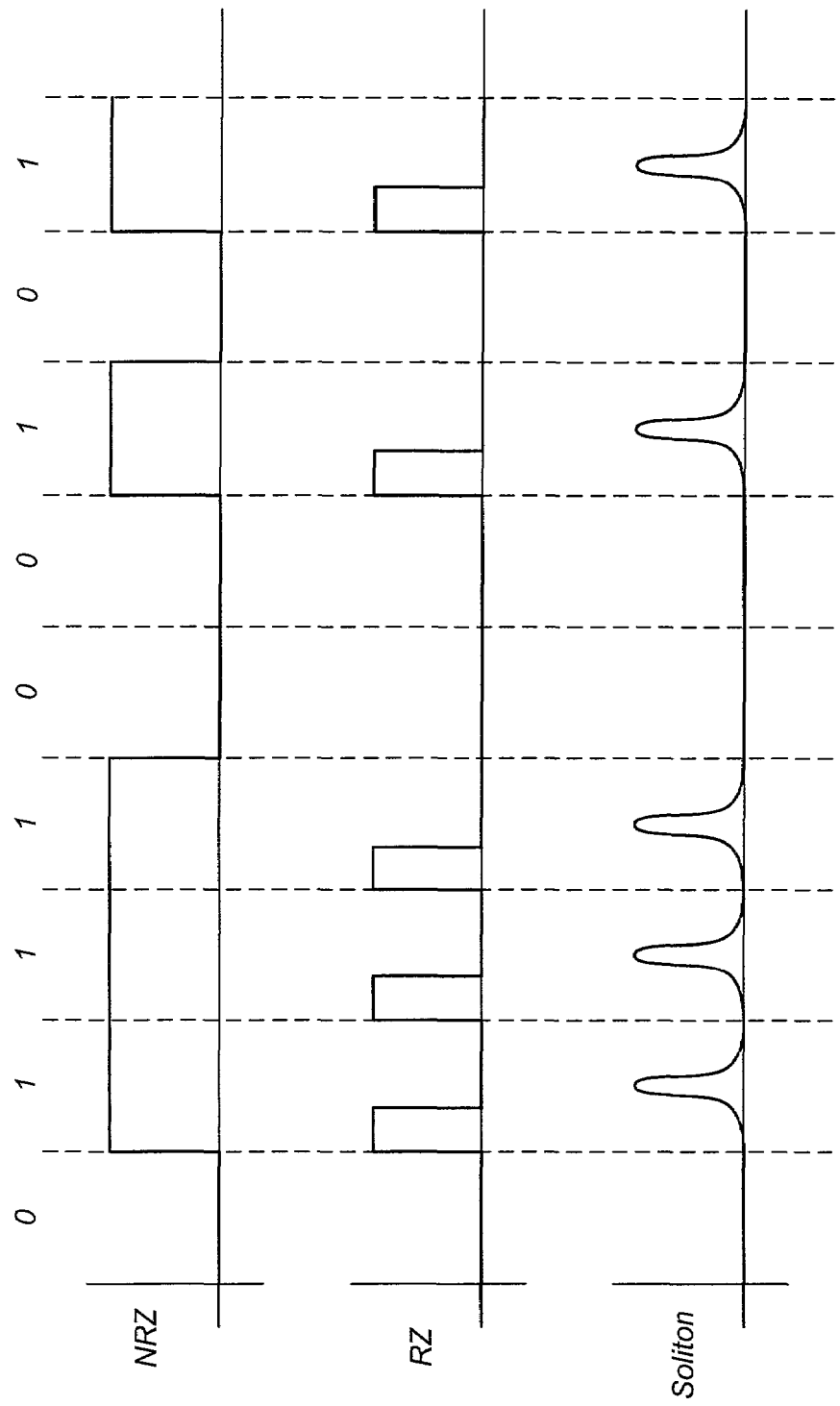
FIG. 1 illustrates an example of a non-return-to-zero (NRZ) formatted optical signal, a return-to-zero (RZ) formatted signal, and a modulated soliton pulse train.
Figure 2:
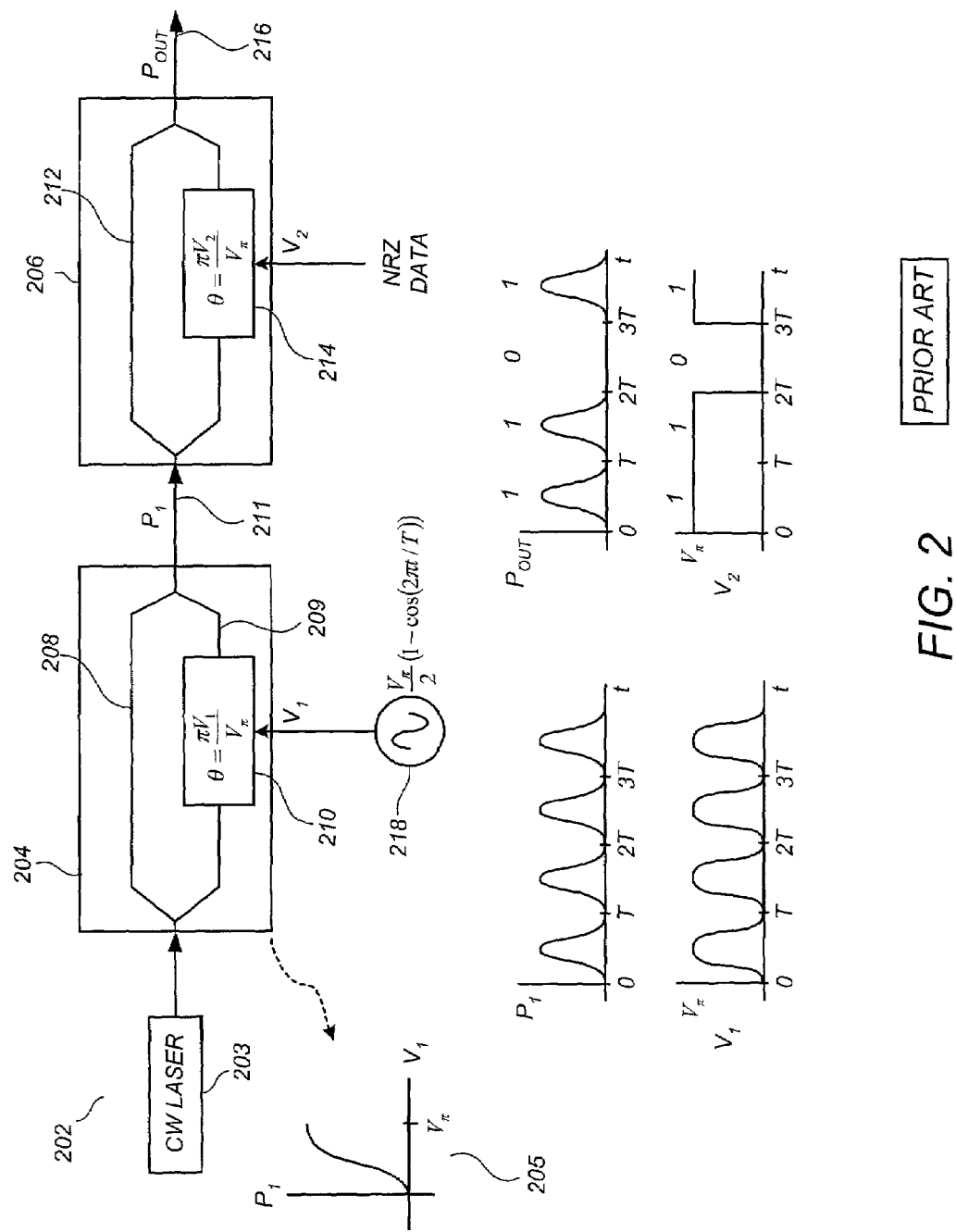
FIG. 2 illustrates a prior art optical RZ signal generator.
Figure 3:
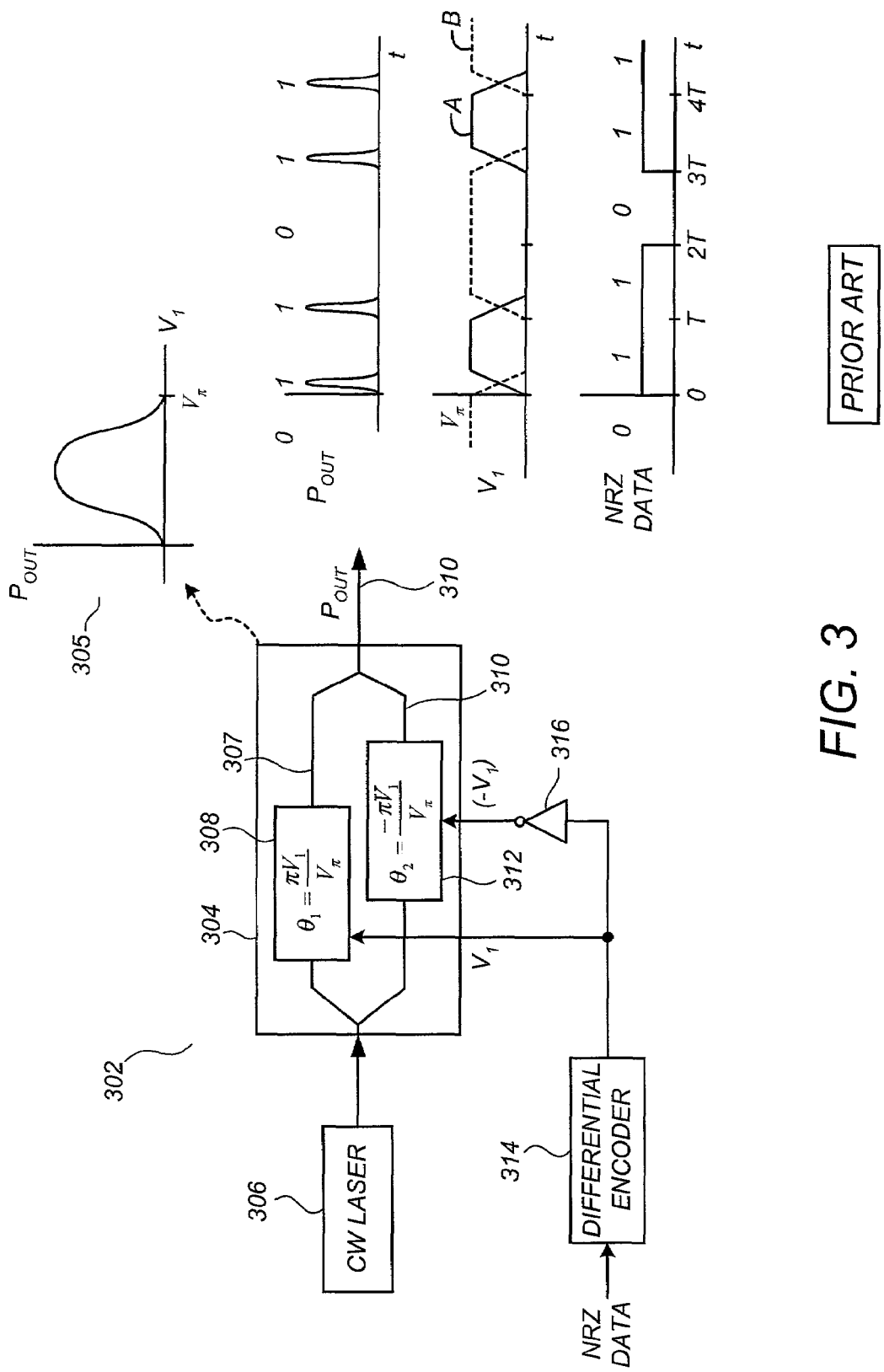
FIG. 3 illustrates a prior art optical RZ signal generator.

The value of the delay τ of the interferometer 412 determines several performance characteristics of the signal generator 401. First, the delay τ represents a lower boundary of the total width of the emitted optical pulses. As described supra, the total pulse width is equal to $(\tau+t_{rise})$ or $(\tau+t_{fall})$ as appropriate. The corresponding optical pulse width as measured by the −3 dB or 50% point will be substantially narrower, of course, than the total pulse width. Advantageously, because the delay τ is a fixed value, the pulse width and optical pulse energy is appreciably stabilized with respect to variations in the rise and fall times of the electronic circuitry driving the electro-optical components. This is especially advantageous over the prior art configuration of FIG. 3 supra, in which the pulse width depends entirely on the rise and fall times $t_{rise}$ and $t_{fall}$, and there is no lower boundary which can be problematic at lower modulation rates. In contrast, the total pulse width of the RZ signal generator 401 has a lower boundary at τ, and any changes $\Delta t_{rise}$ or $\Delta t_{fall}$ will only result in a change of approximately $\Delta t_{rise}/(\tau+t_{rise})$ or $\Delta t_{fall}/(\tau+t_{rise})$ in the total pulse width.

Second, the delay τ of the interferometer 412 also affects the output optical pulse magnitude. In particular, if τ is very small compared to the bit period T (e.g., 1%) such that τ is very small compared to the rise/fall time of the signal x'(t), the RZ pulse strength will be small because the difference x'(t)−x'(t−τ) will be small. It is generally preferable that τ be comparable to the rise and fall times $t_{rise}$ and $t_{fall}$ of the signal x'(t) such that the difference x'(t)−x'(t−τ) will become appreciable over pulse width interval. By way of example, one suitable value for τ would be about 5 ps for the above example in which $t_{rise}=t_{fall}=5$ ps, although other values may result in adequate performance as well. However, as τ increases past about 50% of the bit period T, the performance degrades because the difference x'(t)−x'(t−τ) begins to lose its meaning as being indicative of a derivative of x'(t). Advantageously, according to a preferred embodiment, τ is a fixed delay built into the interferometer 412 and so does not require modulation. Thus, only a single element (the phase modulator 405) requires electro-optical modulation, lowering fabrication costs and increasing reliability.

Notably, if τ were increased to about 100% of the bit period T, it can be readily shown that the transmitted signal z(t) would take on an envelope that is an NRZ formatted version of the original signal x(t). Thus, according to an optional preferred embodiment, the signal generator 401 may be configured as an NRZ optical modulator by setting the delay τ of the interferometer 412 equal to the bit period T.

In addition to being judiciously selected, the delay τ should be maintained with sufficient precision. In particular, letting $\tau=\tau_0+\Delta\tau$ where $\tau_0$ is the exact value that satisfies Eq. (7), it is preferable that the deviation Δτ is sufficiently small such that $2\pi f_c \Delta\tau$ does not exceed about 0.1 radians. The carrier frequency $f_c$ must also be maintained with sufficient precision such that Eqs. (6)–(7) supra are satisfied.

For clarity of disclosure, and not by way of limitation, a numerical design example is presented. Let $f_c$ be equal to a standard WDM carrier frequency of 193.0 THz, let the bit rate of x(t) be 40 Gbps (bit period=25 ps), and let the rise/fall time of the electrical signal x'(t) again be 5 ps. To get the delay τ within a neighborhood comparable to the rise/fall time, one suitable value for "m" is 965, which yields a delay τ of 5.000000 ps. To maintain the value $2\pi f_c \Delta\tau$ less than 0.1 radians, the deviation Δτ should remain less than 0.000082 ps, that is, the delay τ needs to be maintained between 5.000000 ps and 5.000082 ps. In accordance with another preferred embodiment, the delay τ may be regulated by a feedback control circuit to maintain the proper delay tolerances as will be described further infra.

In addition to advantageously providing increased pulse width stability, the RZ signal generator 401 also provides narrower pulse widths and improved extinction ratios. By way of example, if $\tau=t_{rise}=t_{fall}=5$ ps for a modulation rate R=40 Gbps (T=25 ps), the total pulse width will be 10 ps or 40% of the bit period, and the −3 dB pulse width will be substantially narrower (e.g., 20–30% of the bit period). By way of further example, for a modulation rate of R=10 Gbps (T=100 ps), even more relaxed electrical parameters such as $t_{rise}=t_{fall}=15$ ps will yield a total pulse width of 30 ps=30% (where τ is set to 15 ps), and the −3 dB pulse width will be substantially narrower (e.g., 10–20% of the bit period). The extinction ratio of the RZ signal generator 401 is also substantially improved because the delay τ of the interferometer is fixed, rather than modulated. The fixed delay τ, which corresponds to a phase difference of 2πm as described supra, will invariably cause a precise zero-power output as long as the signal x'(t) is not changing, regardless of the actual value of x'(t) at that time. Thus, even if the amplitude of the voltage driving the phase modulator 405 deviates from $V_\pi$, or if environmental factors cause a change in the induced signal delay of the phase modulator 405 when driven at $V_\pi$, the "zeroes" in the output signal z(t) will remain pure because it is changes in the phase θ, and not the absolute value of the phase θ, that cause the presence of energy in the output signal. For these reasons and other reasons, the operation of the RZ signal generator 401 is amenable to operation at substantially higher bit rates, such as 40 Gbps, where conventional RZ signal generators that rely on AM devices are less effective.

Figure 6:
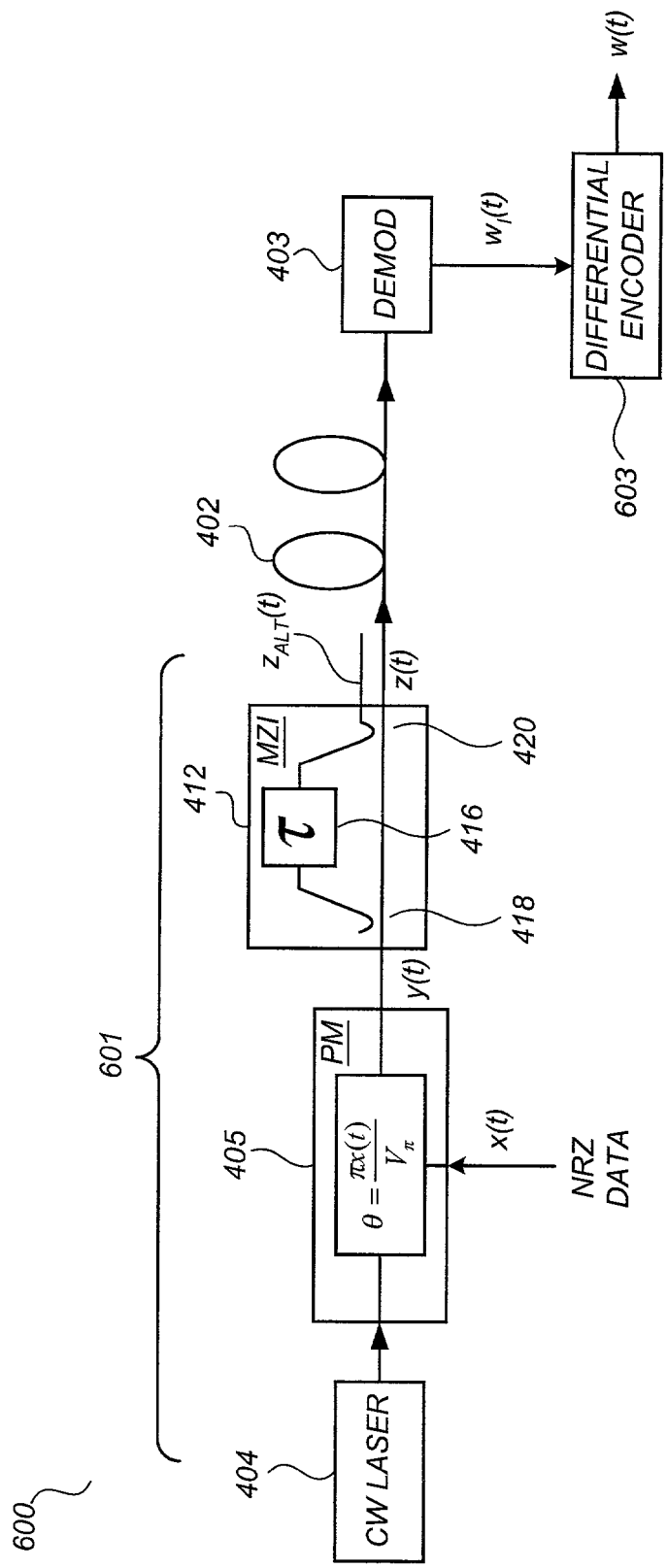
FIG. 6 illustrates an optical RZ signal generator in accordance with a preferred embodiment.

FIG. 6 illustrates an optical communications link 600 comprising an RZ signal generator 601 in accordance with a preferred embodiment, wherein differential encoding is to be performed at the receiving end rather than the source end of the fiber span. RZ signal generator 601 is similar to the RZ signal generator 401 of FIG. 4 except that it contains no differential encoder. Rather, the input NRZ data signal (normalized to $V_\pi$ instead of 1) is provided directly to the phase modulator 405. Optical communications link 600 comprises a differential encoder 603 at the output of a demodulator 403 adapted to receive a stream $w_r(t)$ of RZ optical pulses and generate a differentially-encoded NRZ signal w(t) therefrom.

Figure 7:
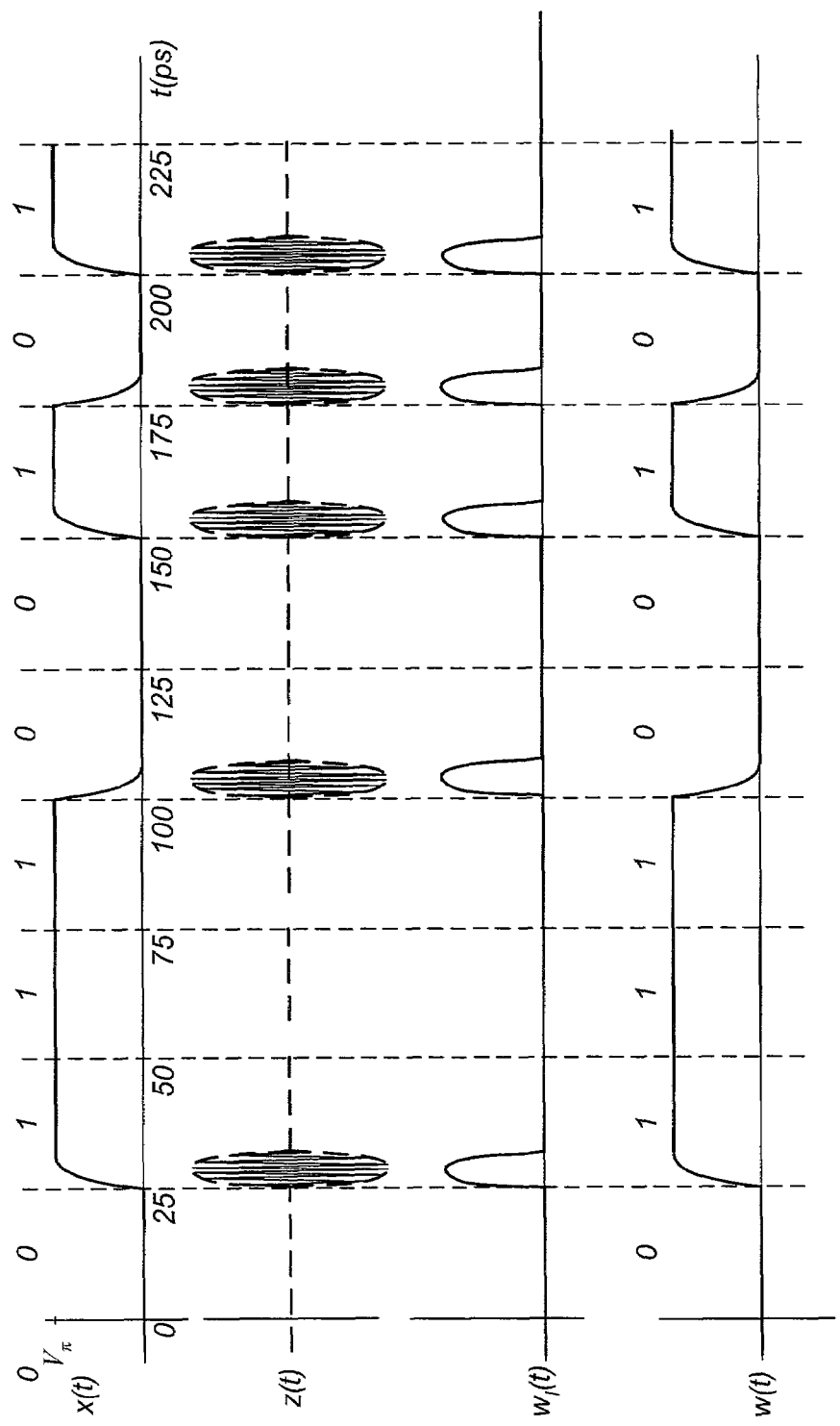
FIG. 7 illustrates exemplary waveforms corresponding to selected locations of the system of FIG. 6.

FIG. 7 illustrates exemplary waveforms corresponding to selected locations of the system of FIG. 6, beginning with the NRZ DATA signal having values of "011100101" (normalized to an amplitude of $V_\pi$). As indicated therein, the signal z(t) transmitted across the fiber span has an envelope that is a differentially-encoded, RZ-formatted version of the NRZ DATA signal. The original NRZ DATA signal bit stream is reproduced at the output w(t) of the differential encoder 603. Unlike the preferred embodiment of FIG. 4, the preferred embodiment of FIG. 6 has a pulse width that depends in part on the rise and fall times $t_{rise}$ and $t_{fall}$ of an externally provided data signal. Like the preferred embodiment of FIG. 4, however, the preferred embodiment of FIG. 6 exhibits pulse width stability and extinction ratio stability. Also, the output pulse widths are similarly narrower when the rise and fall times $t_{rise}$ and $t_{fall}$ are maintained within expected tolerances.

Figure 8:
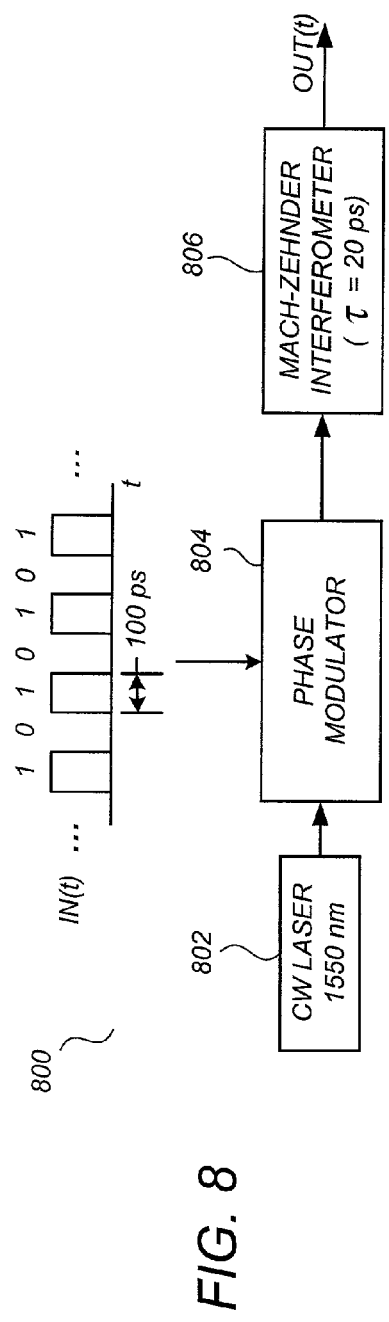
FIG. 8 illustrates a test configuration of an optical RZ signal generator in accordance with a preferred embodiment using off-the-shelf components and generating a repeating-1s test pattern.

FIG. 8 illustrates a test configuration 800 of an optical RZ signal generator in accordance with a preferred embodiment that used off-the-shelf components and generated a repeating-1s test pattern (i.e., a pattern of 1, 1, 1, . . . , 1). Test configuration 800 comprised a standard CW laser 802, an off-the-shelf lithium niobate phase modulator 804, and an off-the-shelf Mach-Zehnder interferometer 806. In particular, phase modulator 804 comprised part number PM-00-12-PFA-PFA, available from EOSPACE, Inc. of Redmond, Wash., and interferometer 806 comprised a 25 GHz Interleaver, part number CFOI0250000, available from Oplink Communications, Inc. of San Jose Calif. having a fixed delay arm of τ=20 ps. An electrical signal IN(t) of alternating ones and zeroes having a bit period T=100 ps (R=10 GHz) was provided.

Figure 9:
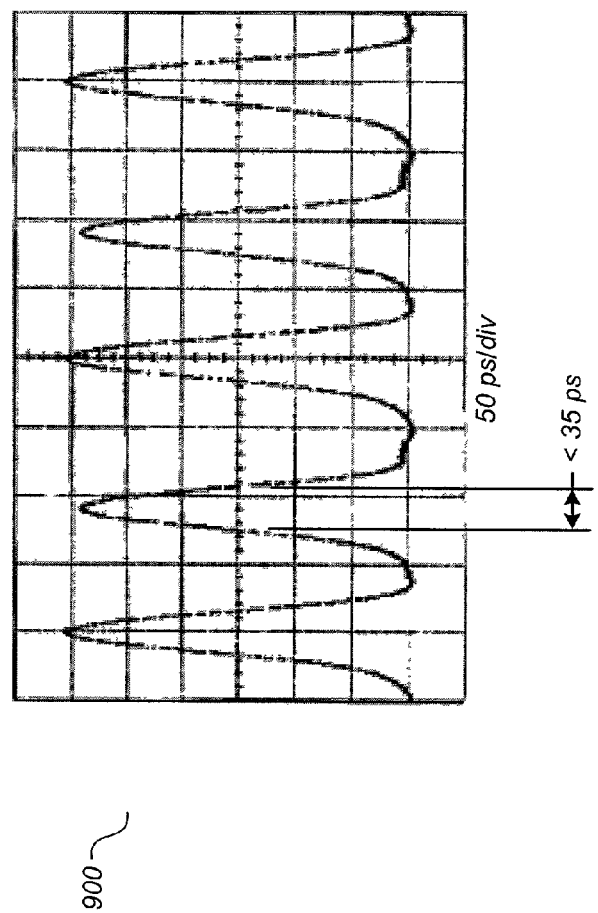
FIG. 9 illustrates an oscilloscope reading corresponding to an output of the test configuration of FIG. 8.

FIG. 9 illustrates an oscilloscope reading 900 corresponding an output of the test configuration of FIG. 8. As indicated in FIG. 9, a repeating-1s test pattern was generated, with each optical pulse having a −3 dB width of less than about 35 ps, i.e., less than about 35% of the bit period T.

The RZ signal generators 401 and 601 of FIGS. 4 and 6, respectively, produce a output signals in which the instantaneous optical frequency $f_{inst}$ deviates from the nominal optical frequency $f_c$. The frequency shift alternates in sign between successive optical pulses, i.e., one pulse has a positive frequency shift, the next pulse has a negative frequency shift, the next pulse has a positive frequency shift, and so on (see FIG. 11, infra). This frequency shifting behavior is distinguished from "chirp," a term that is generally associated with optical pulses in which a positive frequency shift takes place on the rising side of the pulse and a negative frequency shift takes place on the falling side of the same pulse. Such frequency shift might be desirable in some optical communications applications, e.g., in certain long-haul wavelength division multiplexed (WDM) links in which it is desired to use a single bulk dispersion compensation element at the end of the link. However, the presence of such frequency shift is not desirable in other optical communications applications, e.g., when it is desired to distribute several dispersion compensating elements at successive points along the link. Accordingly, it may be desirable to control and/or minimize the amount of such frequency shift in the output signal.

Figure 10:
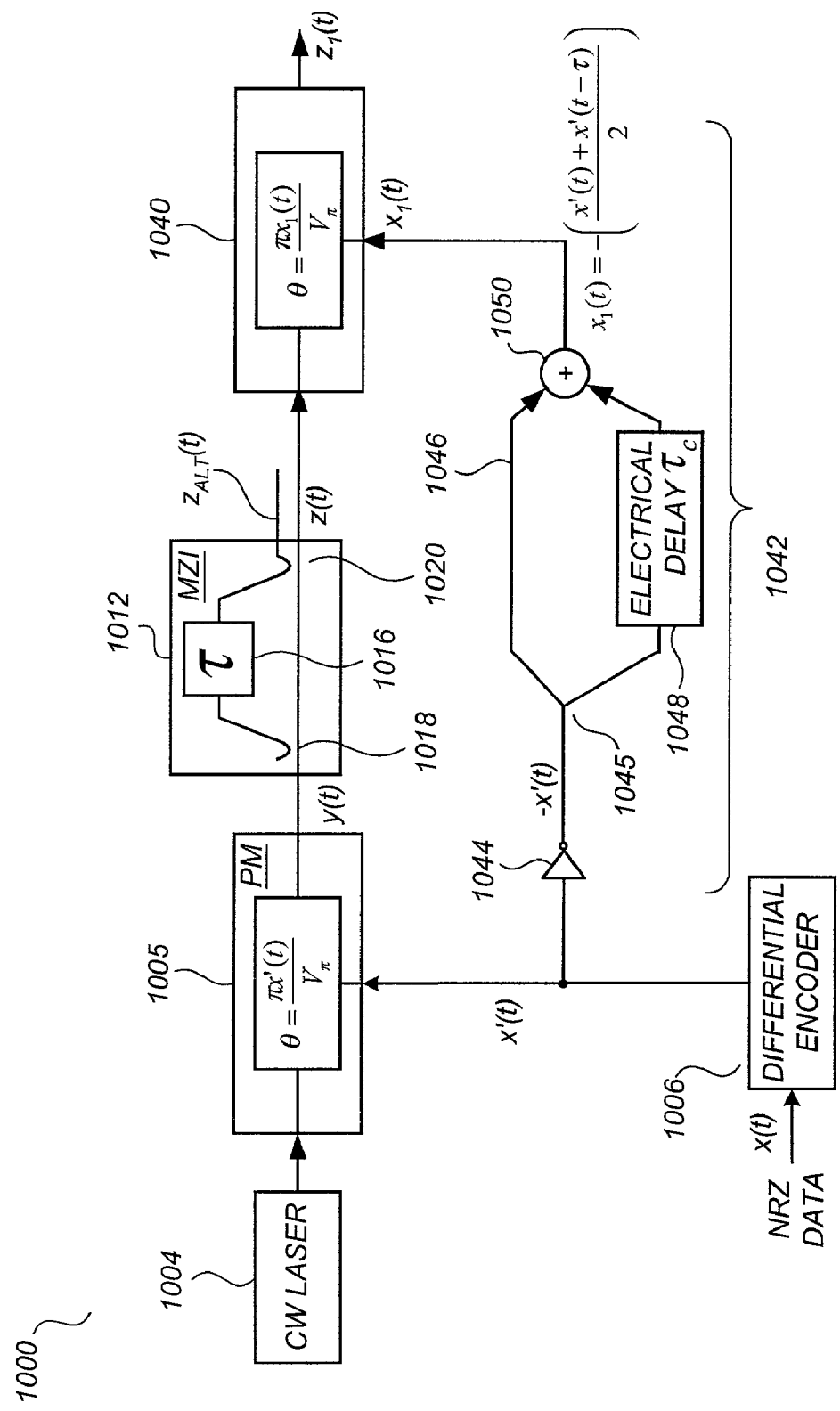
FIG. 10 illustrates an optical RZ signal generator having reduced frequency shift in accordance with a preferred embodiment.

FIG. 10 illustrates an optical RZ signal generator 1000 having reduced frequency shift in accordance with a preferred embodiment. As indicated by Eq. 11 supra, the output z(t) of the RZ signal generator 401 of FIG. 4 contains a frequency shift term in its carrier component, and it may be desirable to reduce or eliminate the amount of this frequency shift in practical applications. RZ signal generator 1000 comprises a CW laser 1004 similar to the CW laser 404 of FIG. 4, a phase modulator 1005 similar to the phase modulator 405 of FIG. 4, an interferometer 1012 similar to the interferometer 412 of FIG. 4, and a differential encoder 1006 similar to the differential encoder 406 of FIG. 4. For a given NRZ data signal x(t), the output of interferometer 1012 is identical to the output z(t) of FIG. 4. RZ signal generator 1000 further comprises a frequency shift compensator 1042 designed to receive the optical signal z(t) and the driving signal x'(t), and to generate an output signal $z_1(t)$ having reduced or eliminate frequency shift.

Figure 11:
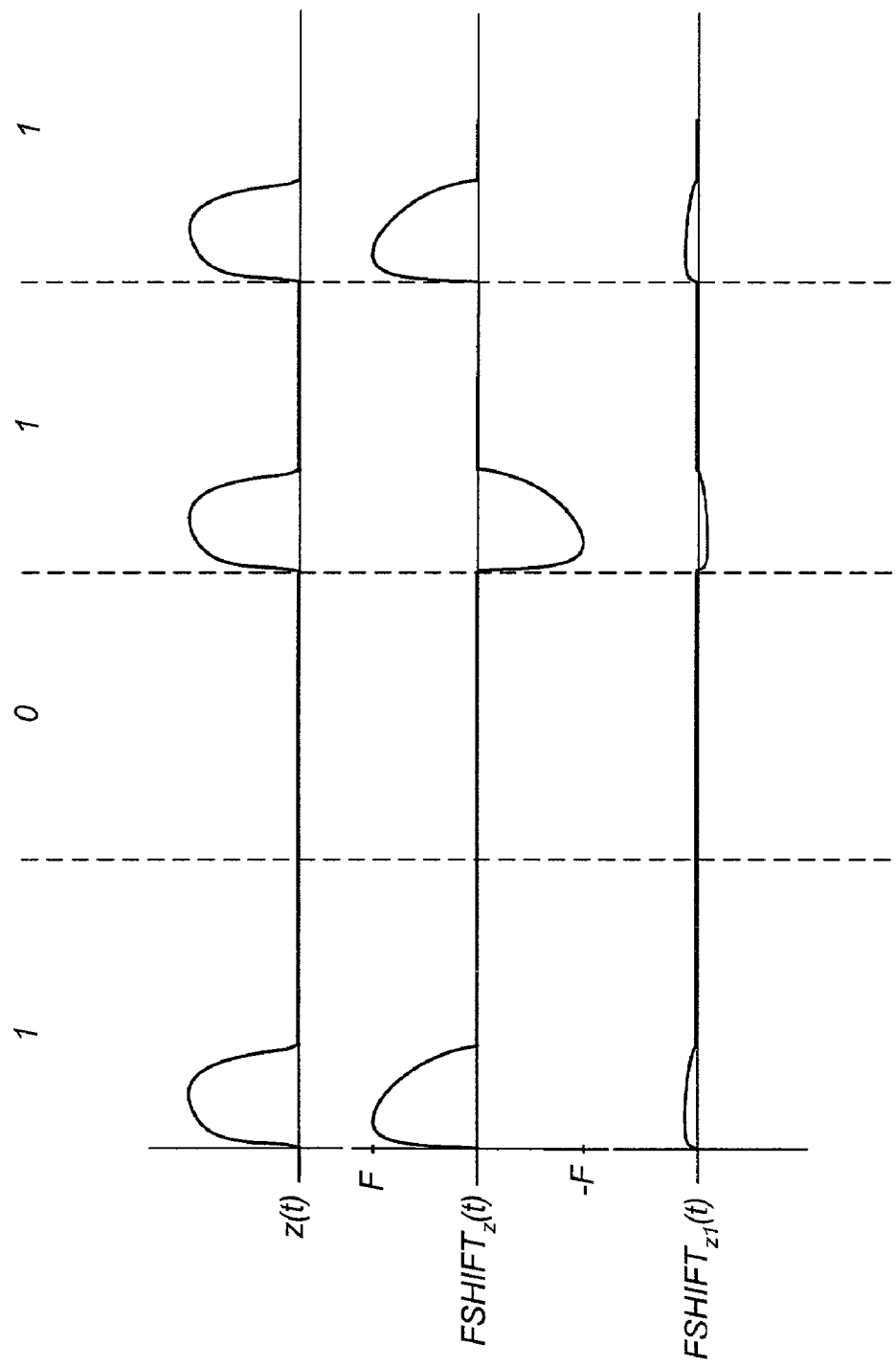
FIG. 11 illustrates exemplary optical envelope and frequency shift waveforms corresponding to selected locations of the system of FIG. 10.

FIG. 11 illustrates exemplary optical envelope and frequency shift waveforms corresponding to selected locations of the system of FIG. 10. When the optical signal z(t) has a "1" RZ pulse, it has a frequency shift $FSHIFT_z(t)$ in a first direction (the positive direction, for example) with a magnitude that sharply increases toward the modulation rate R and then decreases back to zero, as indicated in FIG. 11. For the next pulse, the frequency shift is in the opposite direction (negative, for example) with a similar magnitude profile. Generally speaking, for a bit rate R, the uncompensated signal z(t) will have a frequency shift magnitude of about +/−R, as indicated in FIG. 11. Thus, for a 10 GHz modulation rate, the frequency shift magnitude will be about +/−10 GHz, and the frequency spectrum of the optical signal z(t) will display sideband power at $f_c$+10 GHz and $f_c$−10 GHz.

Frequency shift compensator 1042 comprises an electrical inverter 1044 coupled to receive the signal x'(t) being provided to the phase modulator 1005, an electrical signal splitter 1045 for splitting the inverted signal along a first electrical path 1046 and a second electrical path, the second electrical path comprising an electrical delay element 1048 that induces an electrical delay of $\tau_c$, and an electrical signal combiner 1050 for recombining the electrical signals as shown in FIG. 10, and a compensating phase modulator 1040. Preferably, the electrical delay $\tau_c$ is very close to the optical delay $\tau$ of the delay of the interferometer 1012. An output $x_1(t)$ of the electrical signal combiner 1050 is provided to the compensating phase modulator 1040, which induces a phase delay of $\pi x_1(t)V_\pi$. While the envelope of the output signal $z_1(t)$ remains the same as the envelope of the signal z(t), the carrier component will have an equation shown in Eq. (12) below. In Eq. (12), a delay $\Delta t$ is included, reflecting a propagation time difference between (i) an upper propagation path from the differential encoder 1006 through the phase modulator 1005 and the interferometer 1012 to the compensating phase modulator 1040, and (ii) a lower propagation path from the differential encoder 1006 through the electrical signal splitter 1045 and the electrical signal combiner 1050 to the compensating phase modulator 1040.

$$z_{1,CARRIER}(t) = \sin\left(2\pi f_c t - \pi \frac{x'(t+\Delta t) + x'(t+\Delta t - \tau_c)}{2V_\pi} + \pi \frac{x'(t) + x'(t-\tau)}{2V_\pi}\right) \quad \{12\}$$

Accordingly, when $\tau_c$ is identical to $\tau$ and $\Delta t$ is equal to zero, there will be no frequency shift present in the output signal $z_1(t)$. Because the delays 1016 and 1048 lie along two separate paths, one optical and one electrical, it is less likely that $\tau_c$ is precisely identical to $\tau$. However, as long as the difference $\tau-\tau_c$ is very small compared to the rise or fall time of the signal x'(t), which is generally not a difficult objective to achieve, the amount of frequency shift in the output signal $z_1(t)$ will be very small, as indicated in the plot FSHIFT$_{z1}$(t) of FIG. 11. Of course, the propagation times along the differing optical and electrical paths to the phase modulator 1040 should otherwise be kept identical, i.e., $\Delta t$ should be equal to zero, or their difference $\Delta t$ should be kept very small compared to the rise or fall time of the driving signal x'(t).

Figure 12:
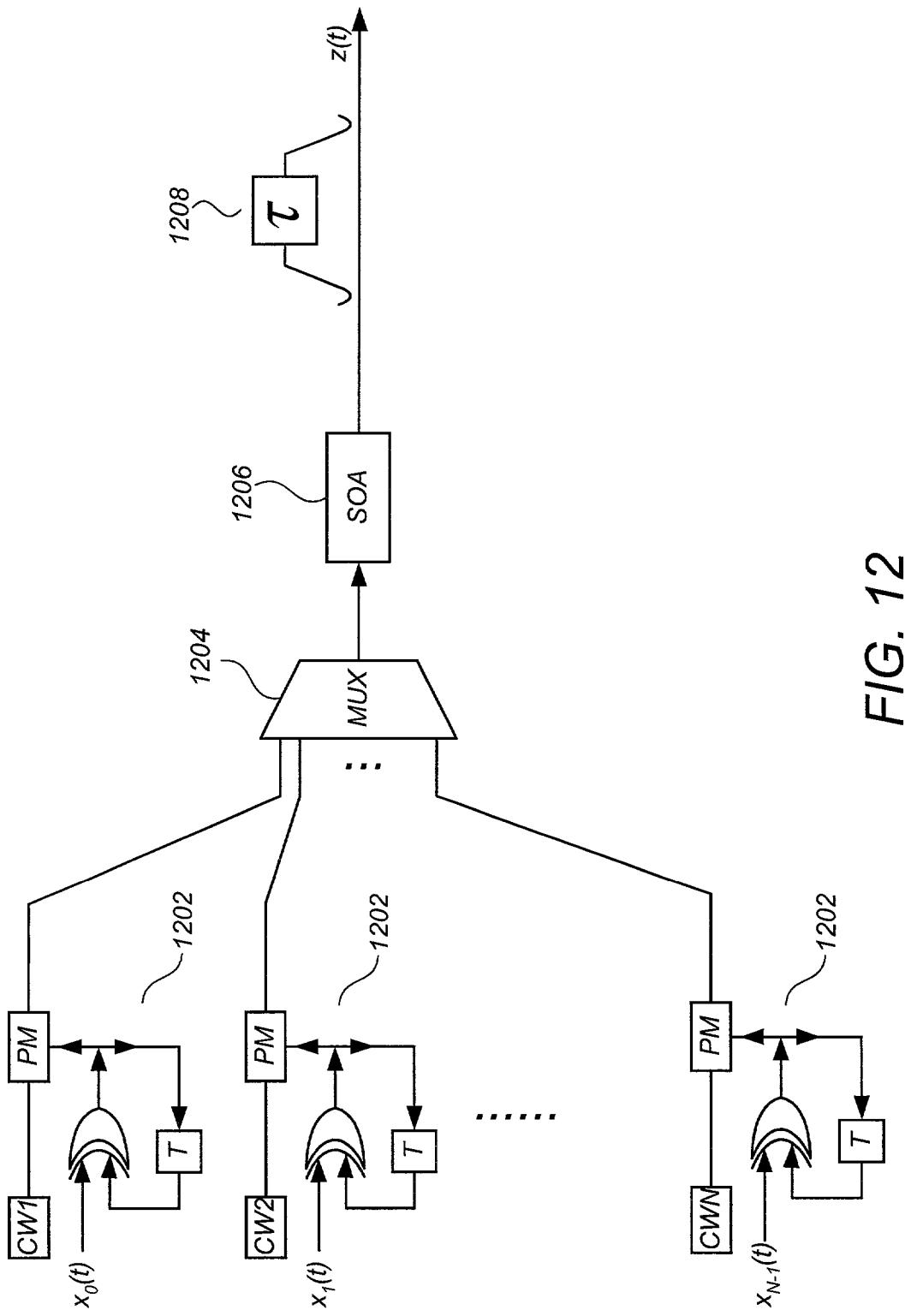
FIG. 12 illustrates a multiple-channel wavelength division multiplexed (WDM) optical RZ signal generator in accordance with a preferred embodiment.

FIG. 12 illustrates an N-channel WDM signal generator in accordance with a preferred embodiment, comprising a plurality of front ends 1202 for differentially encoding and phase modulating the respective input signals $x_0(t)$, $x_1(t)$, ..., $x_{N-1}(t)$ as described supra with respect to like elements of FIG. 4, except that successively different carrier frequencies are used. Each differential encoders of front ends 1202 comprises an exclusive-or (XOR) gate and a feedback loop having a delay of T, i.e., the bit period of the electrical input signal x(t). The outputs of the front ends 1202 are combined into a common light beam by conventional multiplexer 1204 and amplified by semiconductor optical amplifier (SOA) 1206. Finally, the optical signal is fed to a common interferometer 1208 for providing the WDM signal z(t) having NRZ-encoded channels of data.

Importantly, the delay $\tau$ of the interferometer 1208 must be judiciously selected such that the criteria of Eq. (7) or Eq. (9) are satisfied for each of the signals. If a value $\tau$ can be found such that Eq. (7) is satisfied for all channels, then the embodiment of FIG. 4 in which a single output z(t) of interferometer 1208 is used. If the channels are closer together and a value $\tau$ can be found only such that alternating channels satisfy Eq. (7) and Eq. (9), respectively, then both inputs of the interferometer 1208 may be used, in which case all the channels are multiplexed at one common output port prior to transmission. To summarize, if it is desired for N channels to be modulated onto carrier frequencies of $f_0+\Delta f_k$(k=0, ..., N−1), then there should exist integers $m_0$ and $n_k$ (k=0, ..., N−1) and a single value $\tau$ for which either of the following equations (13) or (14) are satisfied for a given value of k:

$$(f_0+\Delta f_k)\tau = (m_0+n_k) \quad \{13\}$$

$$(f_0 + \Delta f_k)\tau = \left(m_0 + n_k + \frac{1}{2}\right) \quad \{14\}$$

Figure 13:
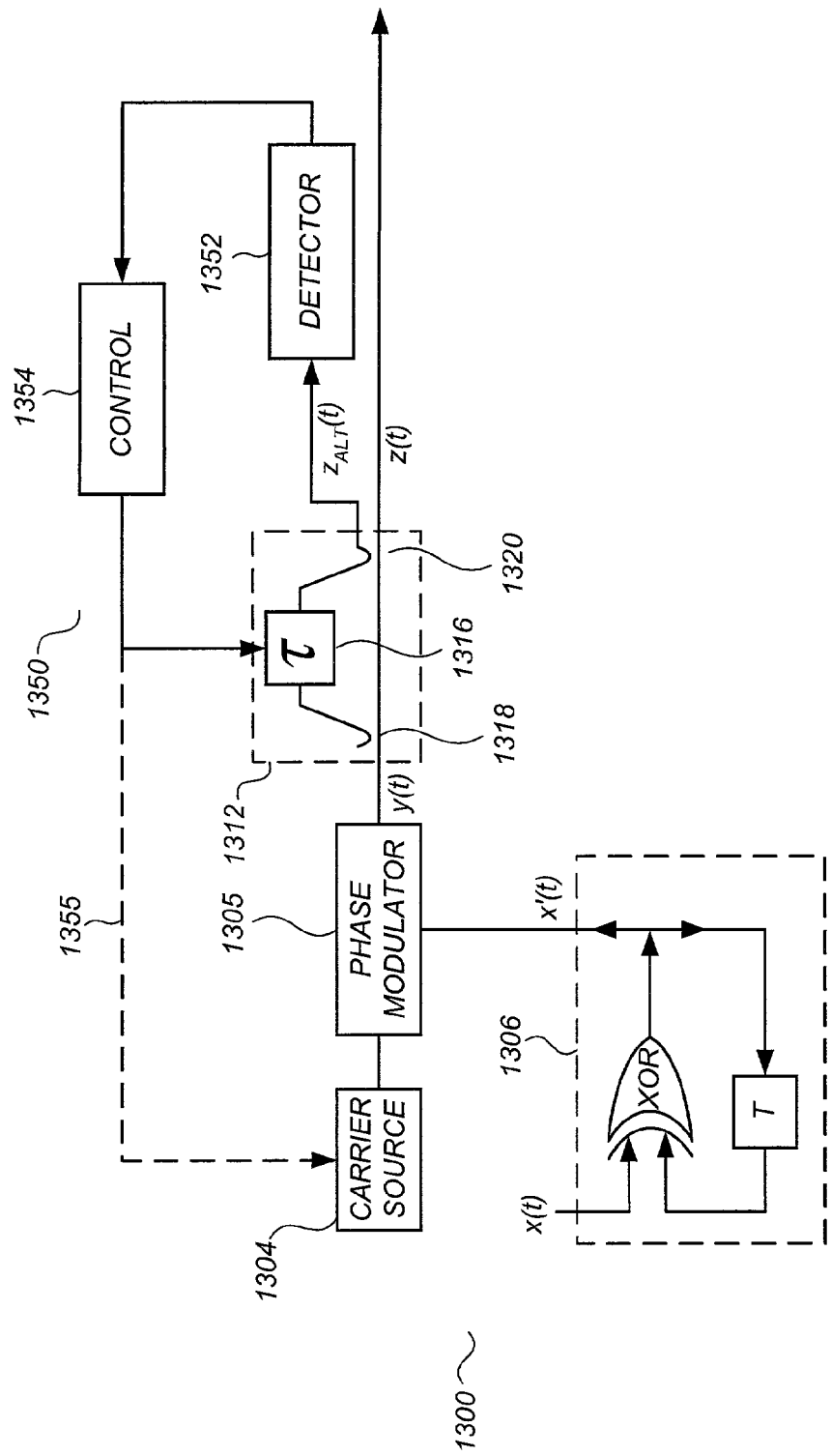
FIGS. 13–15 illustrate optical RZ signal generators including time delay/carrier frequency control circuits in accordance with preferred embodiments.

FIG. 13 illustrates an RZ signal generator 1300 including a time delay/carrier frequency control circuit in accordance with a preferred embodiment. As described supra, it is important that the value of the time delay $\tau$ of the interferometer associated with the preferred signal generator, and/or the carrier frequency $f_c$, be precisely maintained for proper operation such that Eq. (7) remains satisfied for the case in which the z(t) output of the interferometer is used (or Eq. (9) remains satisfied for the case in which the $z_{ALT}(t)$ output of the interferometer is used). For the description below it is assumed that the z(t) output is used. RZ signal generator 1300 comprises a carrier source 1304, a phase modulator 1305, and a differential encoder 1306 similar to elements 404–406, respectively, of the RZ signal generator 401 of FIG. 4, supra. RZ signal generator 1300 further comprises an interferometer 1312 similar to the interferometer 412 of FIG. 4, comprising first and second couplers 1318 and 1320 and a delay element 1316. RZ signal generator 1300 further comprises a time delay/carrier frequency control circuit 1350 comprising a photodetector 1352 coupled to the alternative output $z_{ALT}(t)$ of interferometer 1312, and further comprises an electrical control circuit 1354 configured to vary the delay $\tau$ and/or the carrier frequency $f_c$ responsive to the output of photodetector 1352.

In the embodiment of FIG. 13, it is the subtractive output z(t) of interferometer 1312 that is output to the fiber span. Assuming $f_c$ to be constant, it has been found that when the output z(t) comprises the desired carrier signal modulated in the RZ-format and the delay $\tau$ is at the optimal delay time $\tau_0$, the alternative output $z_{ALT}(t)$ will comprise the carrier beam modulated by an envelope that is a complement of the envelope of z(t), such that for ON bits of z(t) the signal $z_{ALT}(t)$ will be ON for a large portion of the duty cycle after the z(t) envelope goes low, and such that for OFF bits of z(t) the signal $z_{ALT}(t)$ will be ON for the whole bit period. As the delay $\tau$ wanders from the optimal delay time $\tau_0$ and the signal z(t) degrades, the signal $z_{ALT}(t)$ will lose power. The electrical control circuit 1354 is adapted and configured to continually adjust the delay $\tau$ so as to maximize the average power in the signal $z_{ALT}(t)$. Thus, the delay control circuit 1350 is a feedback control circuit that keeps the delay $\tau$ at its optimal value $\tau_0$ to ensure proper operation of the RZ signal generator 1300. Since the delay $\tau$ will vary slowly (e.g., over several seconds) as compared to the bit rate and carrier frequency, high-speed electronics are not necessarily required in the electrical control circuit 1354, and any of a variety of known feedback control laws may be used to regulate the delay $\tau$. Similar principles apply to the additional or alternative case in which the carrier frequency $f_c$ varies and is controlled by the time delay/carrier frequency control circuit 1350.

Figure 14:
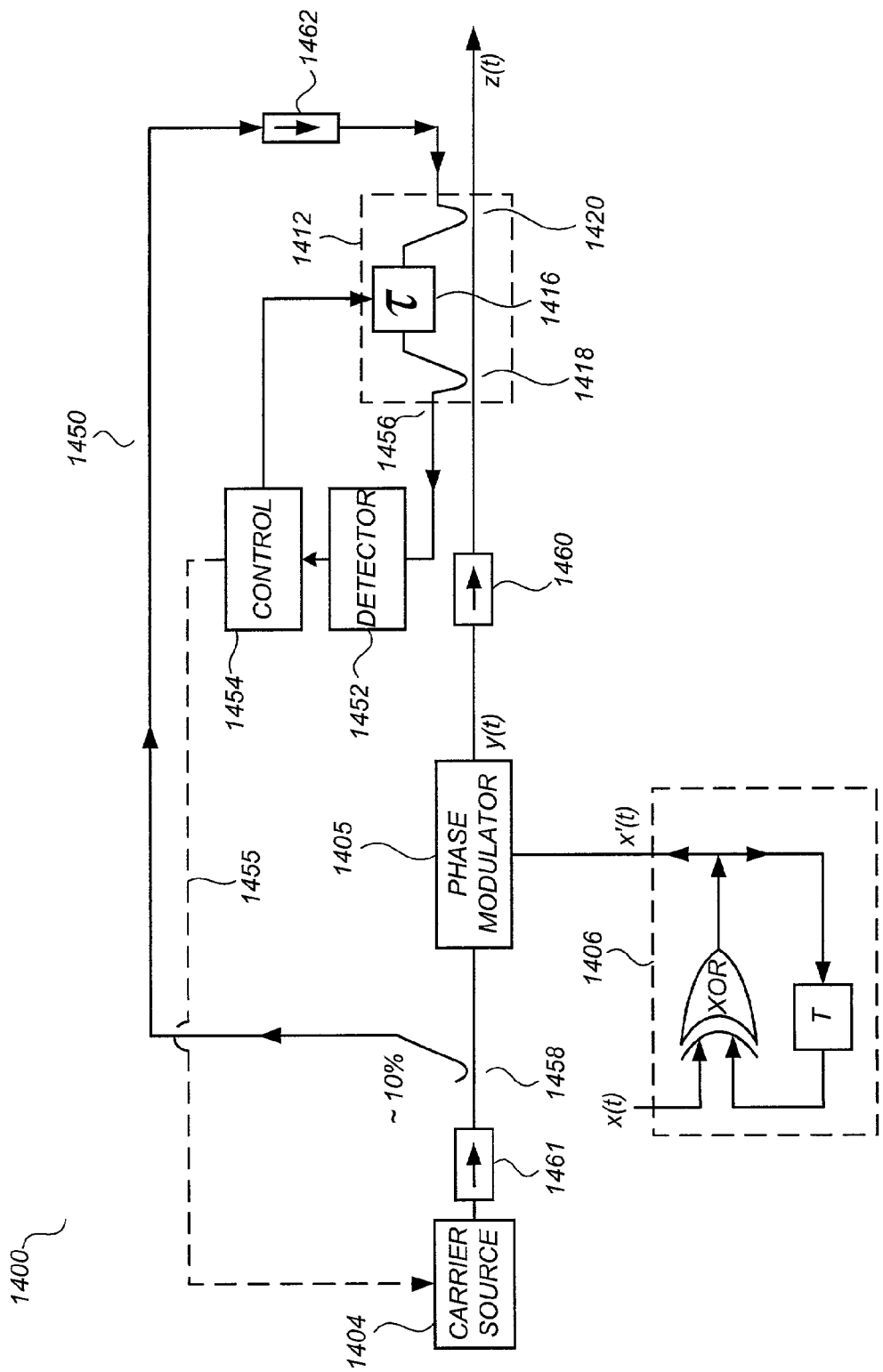

FIG. 14 illustrates an RZ signal generator 1400 including a time delay/carrier frequency control circuit in accordance with another preferred embodiment, wherein a pilot carrier beam tapped from the carrier source is fed through the delay element in a direction opposite the direction of the phase-modulated beam to provide a feedback signal to regulate the delay $\tau$ and/or the carrier frequency $f_c$. RZ signal generator 1400 comprises a carrier source 1404, a phase modulator 1405, and a differential encoder 1406 similar to elements 404–406, respectively, of FIG. 4, supra. RZ signal generator 1400 further comprises an interferometer 1412 similar to the interferometer 412 of FIG. 4, comprising first and second couplers 1418 and 1420 and a delay element 1416 similar to delay element 416 of FIG. 4. RZ signal generator 1400 further comprises a coupler 1458 adapted to tap a small amount of signal (e.g., 10%) from the carrier beam, the tapped beam being hereinafter referred to as a pilot carrier beam. The pilot carrier beam is provided to the alternate output of interferometer 1412. Interferometer 1412 further comprises a node 1456 (unused in previous preferred embodiments). The output at node 1456 is provided to a photodetector 1452, whose output is provided to an electrical control circuit 1454 to control the delay $\tau$ and/or the carrier frequency $f_c$. The power at node 1456 will reach a minimum when the condition of Eq. (7) is satisfied, and the electrical control circuit 1454 regulates the delay $\tau$ and/or the carrier frequency $f_c$ to maintain this minimum. As indicated in FIG. 14, an isolator 1460 is inserted after the phase modulator 1405 to prevent undesired introduction of the pilot carrier beam back into the phase modulator 1405, and isolators 1461 and 1462 are also inserted as shown in FIG. 6 to prevent undesired feedback of signals back into the carrier source 1404.

Advantageously, under normal operating conditions, any perturbations in the time delay $\tau$ take place over a very long time period (e.g., several seconds) compared to the information signal modulation rate, which is well into the GHz range. Moreover, the magnitude of any changes in the time delay $\tau$ as it is being regulated are extremely small, particularly in comparison to the time delay shifts of modulated elements such as the phase modulator 1405. Accordingly, the time delay $\tau$ may still be appropriately referred to as a "fixed time delay" and treated as a true constant in Eqs. (3)–(14), supra, for the embodiment of FIG. 14.

Figure 15:
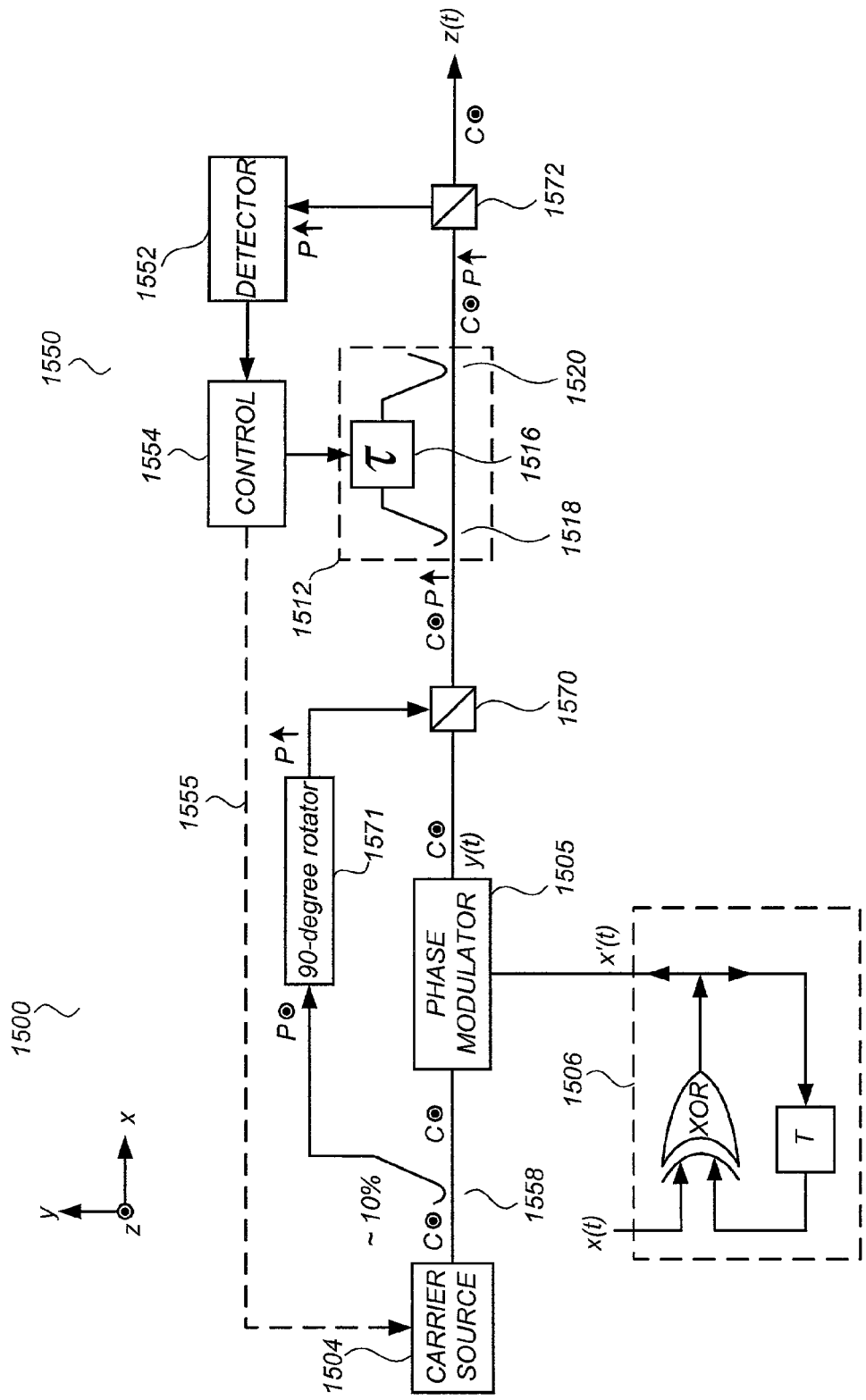

FIG. 15 illustrates an RZ signal generator 1500 including a delay control circuit 1550 in accordance with a preferred embodiment, wherein the polarization of a pilot carrier beam tapped from the carrier source is rotated by 90 degrees, and then the pilot carrier beam is fed through the delay element of the interferometer in the same direction as the phase-modulated beam to provide a feedback signal to regulate the delay $\tau$ and/or the carrier frequency $f_c$. RZ signal generator 1500 comprises a carrier source 1504, a phase modulator 1505, and a differential encoder 1506 similar to like elements of the signal generator of FIG. 14, supra. Signal generator 1500 further comprises an interferometer 1512 similar to the interferometer 1412 of FIG. 14, comprising first and second couplers 1518 and 1520 and a delay element 1516 similar to delay element 1416 of FIG. 14. RZ signal generator 1500 further comprises a coupler 1558 configured to tap a small pilot carrier beam from the input carrier beam.

According to a preferred embodiment, polarization-maintaining fibers are used to couple the components of FIG. 15. Carrier source 1504 provides a z-polarized carrier beam that maintains its polarization through the phase modulator 1505, as indicated by the "C" (for carrier) followed by the z-vector symbol in FIG. 15. At first, the pilot carrier beam also has a polarization in the z direction, as indicated by the "P" (for pilot) followed by the z-vector symbol in FIG. 15. However, the pilot carrier beam is rotated by 90 degrees by a 90-degree rotator element 1571 to be polarized in the y direction, as indicated by the "P" followed by the y-vector symbol in FIG. 15. The two beams are then recombined at a polarization beamsplitter 1570, which maintains their respective polarizations, and the result is provided to the interferometer 1512. As known in the art, these two beams will not interfere with each other in relation to the operation of interferometer 1512.

The output of the interferometer 1512 is then provided to a second polarization beamsplitter 1572, which separates it according to polarization onto two separate paths, a first path containing the z-polarized modulated carrier beam z(t), and a second path containing the y-polarized pilot carrier beam. The y-polarized pilot carrier beam is then provided to a photodetector 1552. In a manner similar to the operation of the device of FIG. 14, an electrical control circuit 1554 will use the output of the photodetector 1552 to properly regulate the delay $\tau$ of the delay element 1516 and/or the carrier frequency $f_c$. The preferred embodiment of FIG. 15 does not require isolator elements as in the preferred embodiment of FIG. 14, although the preferred embodiment of FIG. 14 may be advantageous in that it is not dependent on the particular relative polarizations of the carrier beams and the pilot carrier beams.

Figure 16:
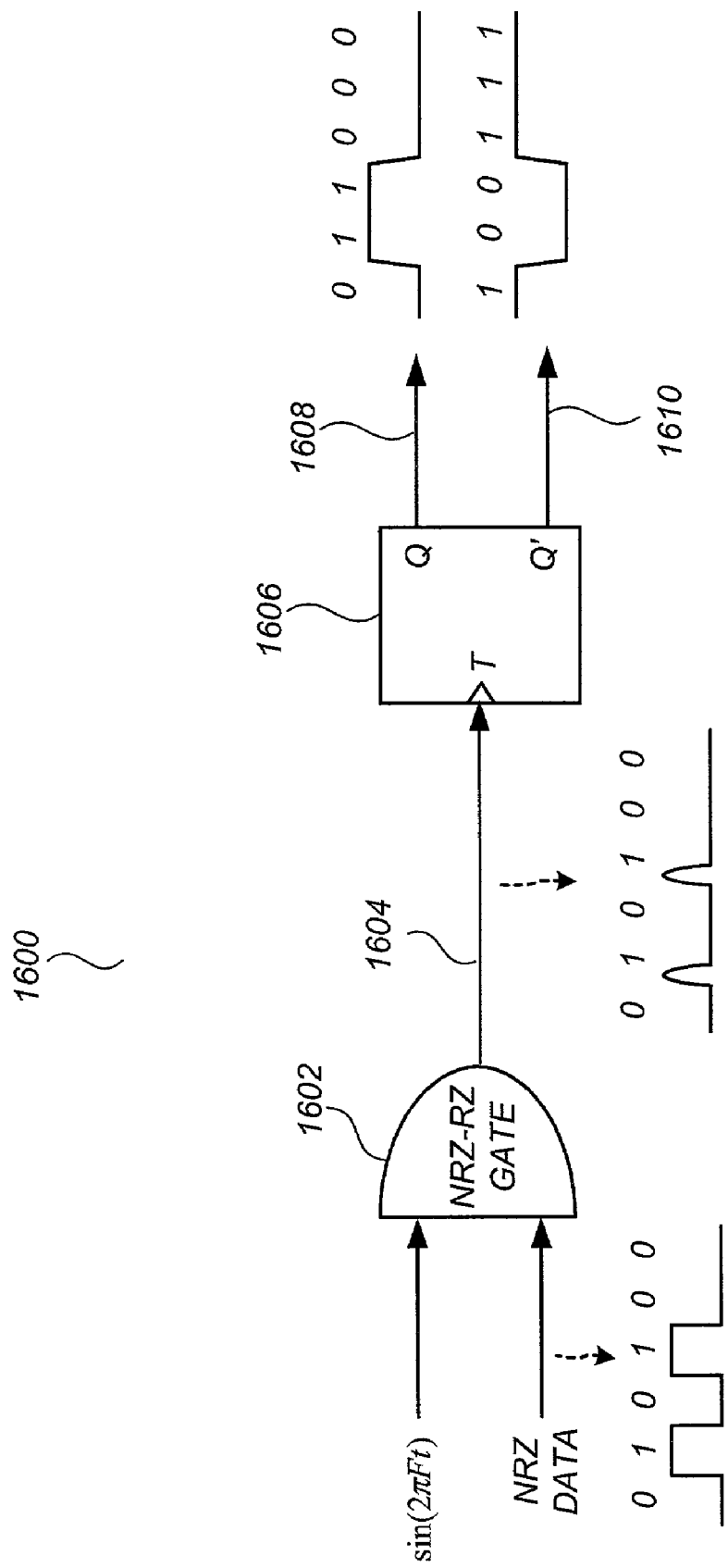
FIG. 16 illustrates a differential encoder portion of an optical RZ signal generator in accordance with a preferred embodiment.

FIG. 16 illustrates a differential encoder 1600 that may be used in conjunction with the preferred embodiments, comprising an off-the-shelf NRZ-RZ gate 1602 and an off-the-shelf T flip-flop 1606. As known in the art, the truth table for T flip-flop 1606 specifies that the output Q change its state whenever the input is a "1" and that the output Q remain the same whenever the input is a "0". The T flip-flop 1606 also provides a complementary output Q' that is the inverse of the output Q. Accordingly, if the differential encoder 1600 is used in conjunction with the preferred embodiment of FIG. 10, supra, it is not required that the differential encoder output signal x'(t) be split into two paths. Rather, the first output Q of the differential encoder 1600 may be provided directly to the phase modulator 1005, and the complementary output Q' may be provided directly to the electrical signal splitter 1045, there being no need for the electrical inverter 1044. The NRZ-RZ gate 1602, available from NEL Electronics of Tokyo, Japan, is designed to receive a sinusoid at frequency R at a first input, the NRZ data signal at bit rate R at a second input, and to produce an electrical RZ-encoded version of the data at an output 1604. The T flip-flop 1606 is triggered at the falling edge of a "1" pulse to cause a toggle in the Q and Q' outputs.

FIGS. 17–20 each illustrate a simplified block diagram of an RZ signal generator with multiple components integrated onto one or more common substrates in accordance with a preferred embodiment. Integration on to as few substrates as possible provides advantages including lower overall production costs and reduced optical losses associated with discrete device interfaces. The examples of FIGS. 17–20 provide for the inclusion of a frequency shift compensating phase modulator (PM) as described supra with respect to FIG. 10, along with its associated electronics. In alternative preferred embodiments, this element may of course be omitted if frequency shift in the output optical signal is permissible, making the overall device even more compact.

Figure 17:
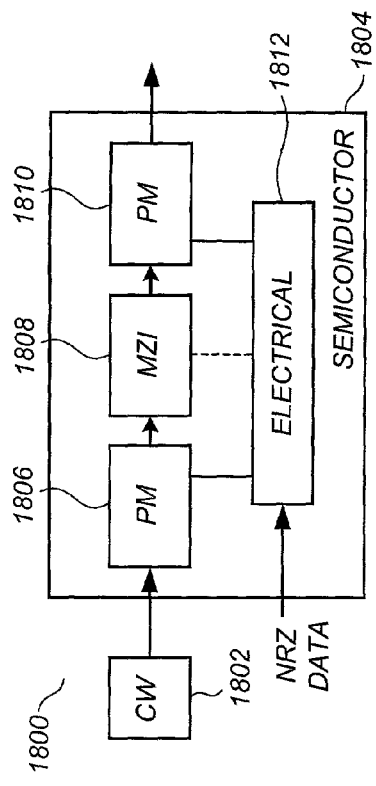
FIGS. 17–20 illustrate conceptual diagrams of optical RZ signal generators having components integrated onto lithium niobate and/or semiconductor substrates in accordance with the preferred embodiments.

FIG. 17 illustrates an RZ signal generator 1700 in accordance with a preferred embodiment comprising a lithium niobate substrate 1704 upon which is integrated a first PM 1706, a Mach-Zehnder interferometer (MZI) 1708, and a second PM 1710. Electrical circuitry for driving the optical components is provided on a separate substrate 1712, as lithium niobate is an electrically insulating material. The first PM 1706 and MZI 1708 perform functions similar to those of the phase modulator 405 and interferometer 412 of FIG. 4, respectively, while the second PM 1708 performs frequency shift compensation similar to the phase modulator 1040 of FIG. 10. A CW laser 1702 that generates the initial carrier signal is provided on a separate substrate. A dotted line is shown between the electrical circuitry 1712 and the MZI 1708 to indicate that the MZI 1708 generally does not require any modulation/control signals except for the embodiments of FIGS. 13–15, supra, in which the delay arm of the MZI is precisely regulated.

Figure 18:
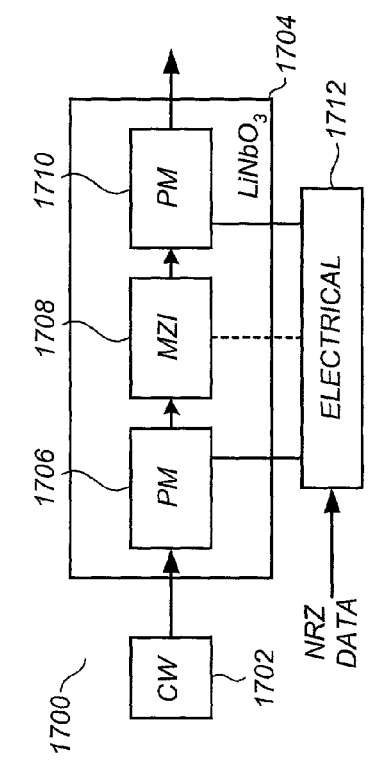

FIG. 18 illustrates an RZ signal generator 1800 in accordance with a preferred embodiment comprising a semiconductor substrate 1804 upon which is integrated a first PM 1806, an MZI 1808, and a second PM 1810. Because the semiconductor substrates are amenable to fabrication of electrical circuits therein, electrical circuitry 1812 for driving the optical components is provided on the same substrate as the optical components. A CW laser 1802 is provided on a separate substrate. The semiconductor substrate 1804 preferably has a zinc blend crystal structure, and in a preferred embodiment comprises a III–V semiconductor substrate. In one preferred embodiment, the RZ signal generator 1800 may comprise a GaAs/AlGaAs material system, while in another preferred embodiment it may comprise a InP/InGaAsP material system.

Figure 19:
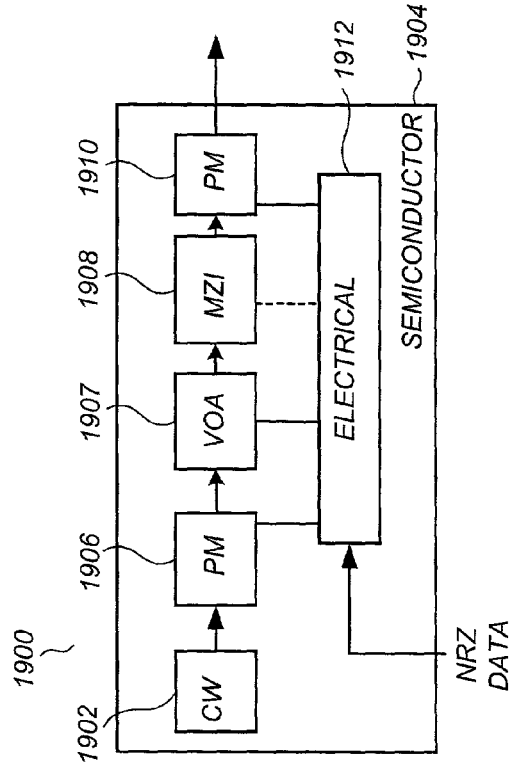

FIG. 19 illustrates an RZ signal generator 1900 in accordance with a preferred embodiment comprising a semiconductor substrate 1904 upon which is integrated a CW laser 1902, a first PM 1906, an MZI 1908, a second PM 1910, and electrical circuitry 1912 for driving the optical components. RZ signal generator 1900 further comprises a variable optical amplifier or attenuator (VOA) 1907 positioned to receive the output of PM 1906, and to provide an amplified or attenuated version of the optical signal to the MZI 1908. The VOA 1907 may provide loss recovery and!or signal equalization functionalities. By integrating the VOA 1907 onto the same chip as the other components in accordance with the preferred embodiments, a single-chip device may provide optical generation, modulation, and equalization of an optical channel that may then be combined with other optical channels into a WDM optical signal. The equalization function, of course, will require external monitoring of all WDM channels and external provision of an equalization control signal to the VOA 1907. According to a preferred embodiment, the VOA 1907 may comprise a semiconductor optical amplifier (SOA) having multiple transverse cavities for exciting the gain medium thereof, as described in U.S. patent application Ser. No. 09/972,146, entitled "SEMICONDUCTOR OPTICAL AMPLIFIER WITH TRANSVERSE LASER CAVITY INTERSECTING OPTICAL SIGNAL PATH AND METHOD OF FABRICATION THEREOF," filed on the same day as this application, which is incorporated by reference herein. Advantageously, such transversely excited SOA device may be operated in either an amplification mode or an attenuation mode, thereby increasing the versatility of the RZ signal generator 1900. Alternatively, the VOA 1907 may comprise an evanescently excited SOA in which the gain medium of the SOA is evanescently excited by a nearby lasing field. In still another preferred embodiment, the VOA 1907 may be provided in the form of a tunable coupler, in which case only attenuation/equalization functionality would be provided by the VOA 1907.

Although the VOA 1907 is shown between the PM 1906 and MZI 1908 for better noise performance, it may alternatively be positioned before the PM 1906 or after the PM 1910. In the latter configuration, in a preferred embodiment in which the VOA 1907 comprises a transversely or evanescently excited SOA device, it may be driven to provide "chirp" to the optical output signal, which may be useful in certain pulse compression applications. When the transversely or evanescently excited SOA device is placed after the MZI 1908, self-phase modulation to the RZ pulses due to the carrier depletion induced by the optical signal will make the RZ pulses chirped. For this, it is preferable that the transversely or evanescently excited SOA device has a fast enough carrier recovery speed in order to suppress the inter-symbol crosstalk.

Figure 20:
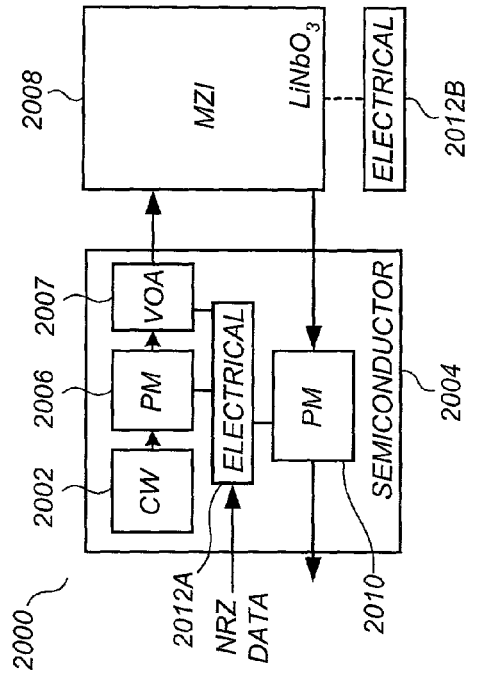

FIG. 20 illustrates an RZ signal generator 2000 in accordance with a preferred embodiment in which a first set of optical components is integrated onto a semiconductor substrate and a second set of optical components is integrated onto a lithium niobate substrate. RZ signal generator 2000 comprises a semiconductor substrate 2004 upon which is integrated a CW laser 2002, a first PM 2006, a VOA 2007, a second PM 2010, and electrical driving circuitry 2012A. An MZI 2008 is provided on a separate lithium niobate substrate, and is configured to induce a change in direction of the optical signal between its input and output so that the other components on semiconductor substrate 2004 may be more compactly arranged. Electrical circuitry 2012B is separately provided to drive the MZI 2008, or alternatively this circuitry may be integrated into the electrical driving circuitry 2012A on the semiconductor substrate 2004.

Figure 21:
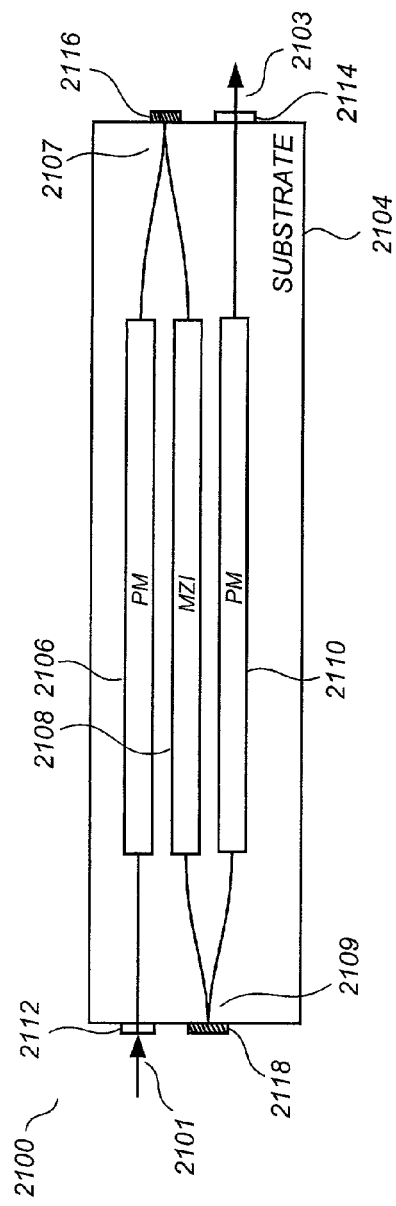
FIGS. 21–22 illustrate optical integrated circuits in accordance with the preferred embodiments.

FIG. 21 illustrates an optical integrated circuit 2100 in accordance with a preferred embodiment, which operates as an RZ signal generator when provided with an optical carrier from an optical source (not shown) and appropriate electronic control circuitry (not shown). The incorporation of optical components onto an integrated substrate such as $LiNb_3$, GaAs, or InP can often result in excessively large device lengths, e.g., on the order of 10–20 cm or more, when the optical components are placed in a linear arrangement as in FIGS. 17–19, supra. This is because the individual optical components such as phase modulators, delay elements, etc., often require several centimeters of length each to achieve their prescribed functionalities. On the other hand, if the optical components are arranged vertically (i.e., side-by-side), the optical path being S-shaped with the optical path being turned 180 degrees between optical components over curved waveguides, there can be excessive bending losses if the radius of curvature of any curved waveguide is less than 1 cm. Because the widths of the optical components themselves are very small, on the order of about 10–20 μm, both of the above scenarios can result in a substantial amount of wasted or unused substrate area, which increases overall device size and cost. It would be desirable to provided an integrated optical circuit such as an RZ signal generator in which there is more efficient use of substrate area.

According to a preferred embodiment, a folded waveguide structure is used to couple successive optical components of the RZ signal generator, thereby substantially reducing the amount of lateral separation between optical components and reducing the overall device size. Optical integrated circuit 2100 comprises a substrate 2104 such as LiNb$_3$, GaAs, or InP, on which is formed a first phase modulator 2106, an MZI 2108, and a second phase modulator 2110 having functionalities similar to like elements shown in FIG. 17. Antireflective coatings 2112 and 2114 are provided at the input 2101 and output 2103, respectively. A folded waveguide structure 2107 is used to couple the first phase modulator 2106 to the MZI 2108, in which optical waveguides converge at shallow angles (e.g., 1–5 degrees) and terminate at a reflectivity-enhanced surface 2116 such as a mirror. The folded waveguide structures 2107 are configured and dimensioned such that most of the light exiting the first phase modulator 2106 is directed onward toward the MZI 2108. It has been found that very close spacing, on the order of a few millimeters or less, can be achieved between the first phase modulator 2106 and the MZI 2108 using the folded waveguide structure 2107. FIG. 21 also shows another folded waveguide structure 2109 including a reflectivity-enhanced surface 2118 for coupling the MZI 2108 to the second phase modulator 2110. Suitable coupling configurations and angles for the folded waveguide structures 2107 and 2109 can be found in U.S. Pat. No. 6,243,516, which is incorporated by reference herein. The reflectivity-enhanced surfaces 2116 and 2118 should be flat and precisely oriented with respect to the converging optical waveguides. Advantageously, most conventional optical integrated circuit fabrication techniques already provide for the formation of very flat and straight substrate edges for enabling efficient coupling with external optical fibers. Thus, very flat and smooth reflective surfaces are "automatically" provided for forming precise reflectivity-enhanced surfaces 2116 and 2118.

Figure 22:
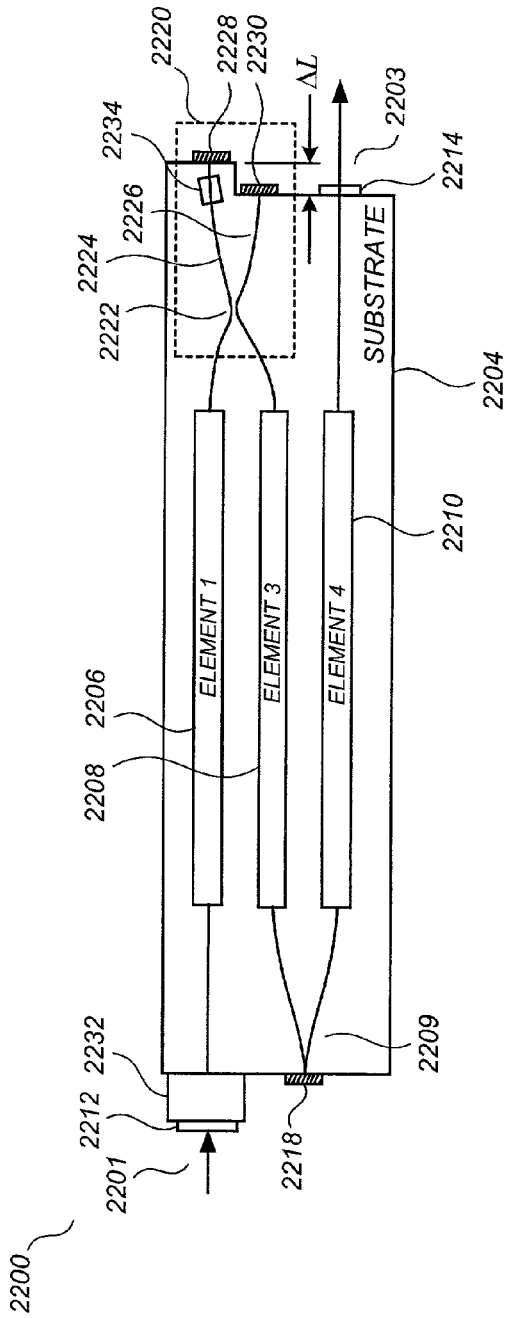

FIG. 22 illustrates an optical integrated circuit 2200 in accordance with a preferred embodiment, which is shown as a generic optical device comprising optical components 2206, 2208, and 2210. According to a preferred embodiment, when the functionality of an interferometer is required in an optical integrated circuit, a dual-function edge interferometer can be used to achieve the combined functions of an interferometer and a folded waveguide structure, thereby further increasing efficiency of substrate use. Optical integrated circuit 2200 comprises a substrate 2204, a folded waveguide structure 2209 with mirror 2218 similar to elements 2109 and 2118 of FIG. 21, respectively, and antireflective surfaces 2212 and 2214 at the device input 2201 and output 2203, respectively. A dual-function edge interferometer 2220 is formed in the optical path between the first element 2206 and the third optical element 2208. Dual-function edge interferometer 2220 is a Michelson interferometer, containing a single coupler 2222, a first arm 2224, a second arm 2226, and first and second mirrors 2228 and 2230, respectively. As indicated in FIG. 22, an edge of the substrate 2204 is shaped such that the first arm 2224 exceeds the second arm 2226 in length by a distance ΔL. By way of example, if the required fixed time delay difference τ is 10 ps, and if the speed of light in the substrate is c/3, the distance ΔL would be 0.5 mm. The edge of the substrate 2204 can be processed using known methods to achieve the spacing ΔL. An electrically controlled element 2234 may be placed near one of the interferometer arms to allow for precise fine-tuning of the time delay τ. Because the dual-function edge interferometer 2220 is a Michelson interferometer, light will be reflected back into the source when there is destructive interference at the output. Accordingly, an isolator 2232 is provided near the input to assure that light is not reflected back into the carrier source.

Accordingly, the dual-function edge interferometer 2220 represents an integrated optical circuit for interferometrically redirecting an optical signal from propagation in a first direction on a first waveguide coming from the first optical component 2206, to propagation in a second direction on a second waveguide leading to the third optical component 2208, the second direction being approximately opposite the first direction. The second waveguide is separated from the first waveguide by less than a minimum bending radius corresponding to the material system of the substrate 2204 upon which the integrated optical circuit is formed. The integrated optical circuit comprises an optical coupler 2222 having an input coupled to the first waveguide, an output coupled to the second waveguide, a first intermediate port, and a second intermediate port. The integrated optical circuit further comprises a first reflective surface 2228 formed on a first edge of the substrate, a first interferometer arm 2224 coupled between the first intermediate port and the first reflective surface, a second reflective surface 2230 formed on a second edge of the substrate, and a second interferometer arm 2226 coupled between the second intermediate port and the second reflective surface. The first and second substrate edges are positioned with respect to the optical coupler such that an effective path length of said first interferometer arm differs from an effective path length of said first interferometer arm by a predetermined amount corresponding to a desired interferometric time delay τ. The first and second substrate edges form a step-like indentation along a major edge of the substrate, i.e. the right edge of the substrate 2204 in FIG. 22.

Whereas many alterations and modifications of the present invention will no doubt become apparent to a person of ordinary skill in the art after having read the foregoing description, it is to be understood that the particular embodiments shown and described by way of illustration are in no way intended to be considered limiting. For example, in another preferred embodiment, the phase modulators used may comprise semiconductor optical amplifiers (SOA) configured using known methods to achieve phase modulation. As another example, while the phase modulators supra are described as being driven by electrical driving signals, any of a variety of devices capable of phase modulation may be used, including devices that may be driven by electrical, mechanical, acoustical, optical, or other types of driving signals. As another example, while the substrate edges containing the mirrors of the dual-function edge interferometer of FIG. 22 are shown as being parallel, any of a variety of mirror orientations and/or waveguide configurations may be used to achieve the required interferometer arm path differences, including those described in U.S. Pat. No. 6,104,847, which is incorporated by reference herein. Therefore, reference to the details of the preferred embodiments are not intended to limit their scope, which is limited only by the scope of the claims set forth below.

What is claimed is:

1. An apparatus for generating return-to-zero (RZ) optical pulses corresponding to an information signal, comprising:
   a phase modulator for causing a phase change in an optical carrier signal responsive to a transition in a driving signal derived from the information signal; and
   an interferometer coupled to receive an output of said phase modulator, said interferometer causing a fixed time delay between first and second signals derived from said output of said phase modulator, said fixed time delay being selected such that said first and second signals destructively interfere when no phase change is occurring in said output of said phase modulator and such that said first and second signals do not destructively interfere when said phase change does occur, an output of said interferometer comprising RZ optical pulses corresponding to said transitions in said driving signal.

2. The apparatus of claim 1, wherein said fixed time delay is set to an integer multiple of a period of the optical carrier signal, and wherein said interferometer output corresponds to a subtractive combination of said first and second signals.

3. The apparatus of claim 1, wherein said fixed time delay is set to an integer multiple of a period of the optical carrier signal plus one-half of said period, and wherein said interferometer output corresponds to an additive combination of said first and second signals.

4. The apparatus of claim 1, wherein said driving signal and said information signal are electrical signals.

5. The apparatus of claim 1, further comprising a differential encoder for receiving said information signal and generating said driving signal therefrom, said output of said interferometer having a binary pattern equal to a binary pattern of said information signal.

6. The apparatus of claim 5, said RZ optical pulses at said output of said interferometer having an induced frequency shift, said apparatus further comprising a phase modulating element at the output of said interferometer for imposing a compensating frequency shift on said RZ optical pulses, said compensating frequency shift being opposite in sign and substantially equal in magnitude to the induced frequency shift.

7. The apparatus of claim 6, wherein said phase modulator, said interferometer, and said phase modulating element are integrated onto a common substrate having a material system selected from the group consisting of: lithium niobate, semiconductor, InP, and GaAs.

8. The apparatus of claim 6, said driving signal and said information signal being electrical signals, said phase modulating element being driven by a first electrical signal derived from said driving signal.

9. The apparatus of claim 8, further comprising:
an electrical splitter for splitting said driving signal into second and third electrical signals;
an electrical delay element for delaying said third electrical signal with respect to said second electrical signal by an amount substantially equal to said fixed time delay of said interferometer; and
an electrical combining element for combining said second and third electrical signals to form said first electrical signal.

10. The apparatus of claim 1, wherein said driving signal is proportional to said information signal, said output of said interferometer having a binary pattern equal to a differentially encoded version of a binary pattern of said information signal.

11. The apparatus of claim 1, further comprising:
an optical source for providing said optical carrier signal at a carrier frequency; and
a feedback control circuit for precisely regulating either or both of (i) said fixed time delay of said interferometer, and (ii) said carrier frequency of said optical source.

12. The apparatus of claim 11, said feedback control circuit comprising:
a detector coupled to an auxiliary output of said interferometer, said detector measuring an average optical power at said auxiliary output; and
a control circuit coupled to said detector and to a fixed time delay element of said interferometer, said control circuit manipulating either or both of said fixed time delay and said carrier frequency such that said average optical power is maintained at an extremum.

13. The apparatus of claim 11, said optical carrier signal being polarized at a first polarization angle, said feedback control circuit comprising:
a coupler for tapping a pilot beam from said optical carrier signal prior to phase modulation of said optical carrier signal;
a 90-degree rotating element coupled to said coupler for causing said pilot beam to be at a second polarization angle that is 90-degrees from said first polarization angle;
a first polarization beamsplitter positioned between said phase modulator and said interferometer for combining said pilot beam with said phase modulator output, said pilot beam not interacting with said phase modulator output in said interferometer due to said 90-degree polarization difference, said output of said interferometer comprising said pilot beam at said second polarization angle and said RZ optical pulses at said first polarization angle, said pilot beam having an average power level that is at an extremum when said fixed time delay of said interferometer is at an optimal value;
a second polarization beamsplitter for receiving said interferometer output and extracting said pilot beam therefrom;
a detector coupled to said polarization beamsplitter for receiving said pilot beam and measuring said average power level thereof; and
a control circuit coupled to said detector and to a fixed time delay element of said interferometer, said control circuit manipulating either or both of said fixed time delay and said carrier frequency such that said average optical power of said pilot beam is maintained at said extremum.

14. The apparatus of claim 1, wherein said fixed time delay is set approximately equal to an average duration of said transitions of said driving signal.

15. The apparatus of claim 1, wherein said phase modulator and said interferometer are integrated onto a common substrate having a material system selected from the group consisting of: lithium niobate, semiconductor, InP, and GaAs.

16. The apparatus of claim 15, further comprising a folded waveguide structure formed at an edge of said common substrate for coupling said interferometer to said phase modulator.

17. The apparatus of claim 15, said interferometer being a Michelson interferometer, said interferometer comprising:
an optical coupler;
a first arm between said optical coupler and a first mirror formed along a first edge of said substrate; and
a second arm between said optical coupler and a second mirror formed along a second edge of said substrate;
wherein said first and second edges are positioned with respect to said optical coupler so as to achieve a predetermined path difference between said first arm and said second arm corresponding to said fixed time delay.

18. The apparatus of claim 15, said common substrate being a semiconductor substrate, further comprising a variable-gain optical element integrated onto said common substrate, said variable-gain optical element comprising a semiconductor optical amplifier having a gain medium that is excited by lasing fields oriented in a direction different than a direction of signal propagation therethrough.

19. A method for generating return-to-zero (RZ) optical pulses corresponding to an information signal, comprising:
generating a driving signal from said information signal, said driving signal having two or more levels, said driving signal having level transition intervals of finite duration;
generating a phase-modulated optical signal from an optical carrier signal by causing phase changes therein during said level transition intervals of said driving signal;
generating first and second optical signals from said phase-modulated optical signal, said second signal being a substantially identical but delayed version of said first signal, said second signal being delayed with respect to said first signal by an unmodulated, predetermined, fixed time delay τ; and
combining said first and second optical signals to produce a resultant optical signal;
wherein said fixed time delay τ is selected such that said first and second optical signals destructively combine when no phase change is occurring in said phase-modulated optical signal, and such that said first and second optical signals do not destructively interfere when said phase change does occur, whereby said resultant optical signal comprises RZ optical pulses during said level transition intervals of said driving signal.

20. The method of claim 19, wherein said fixed time delay is an integer multiple of a period of the optical carrier signal, and wherein said step of combining comprises the step of forming a subtractive combination of said first and second optical signals.

21. The method of claim 19, wherein said fixed time delay is an integer multiple of a period of the optical carrier signal plus one-half of said period, and wherein said step of combining comprises the step of forming an additive combination of said first and second optical signals.

22. The method of claim 19, wherein said driving signal is generated by differentially encoding said information signal, said RZ optical pulses having a binary pattern equal to a binary pattern of said information signal.

23. The method of claim 22, said RZ optical pulses having an induced frequency shift, said method further comprising imposing a compensating frequency shift on said RZ optical pulses, said compensating frequency shift being opposite in sign and substantially equal in magnitude to the induced frequency shift.

24. The method of claim 23, wherein said driving signal and said information signal are electrical signals, and wherein imposing a compensating frequency shift comprises:
splitting the driving signal into first and second electrical signals;
delaying the second electrical signal with respect to the first electrical signal by an amount substantially equal to the fixed time delay τ; of said interferometer;
combining the first and second electrical signals to form a third electrical signal; and
phase-modulating said RZ optical pulses with a phase modulator driven by the third electrical signal.

25. The method of claim 19, wherein the driving signal is proportional to the information signal, the RZ optical pulses having a binary pattern equal to a differentially encoded version of a binary pattern of the information signal.

26. The method of claim 19, further comprising precisely regulating either or both of (i) said fixed time delay τ, and (ii) a carrier frequency of said optical carrier signal to an optimal value.

27. The method of claim 26, further comprising:
measuring an average optical power of a complementary resultant signal associated with said step of combining; and
manipulating either or both of said fixed time delay τ and said carrier frequency such that said average optical power of the complementary resultant signal is maintained at an extremum.

28. The method of claim 26, the optical carrier signal being polarized at a first polarization angle, further comprising:
tapping a pilot beam from the optical carrier signal prior to said step of generating a phase-modulated optical signal;
rotating the pilot beam to a second polarization angle that is 90-degrees from the first polarization angle;
combining the pilot beam with said phase-modulated optical signal prior to said step of generating first and second optical signals, the resultant optical signal comprising the pilot beam at the second polarization angle and the RZ optical pulses at the first polarization angle;
extracting the pilot beam from the resultant optical signal;
measuring an average power level of the pilot beam; and
manipulating either or both of said fixed time delay τ and said carrier frequency such that the average optical power of the pilot beam is maintained at an extremum.

29. The method of claim 19, wherein the fixed time delay τ is set approximately equal to an average level transition interval of the driving signal.

30. An apparatus, comprising:
a first optical device having a first input for receiving an optical carrier signal, a second input for receiving a first voltage, and an output, said first optical device being capable of inducing a variable phase change in the optical carrier signal proportional to the first voltage for generating a phase-modulated optical signal at said output thereof;
a second optical device having an input for receiving the phase modulated signal and an output, said second optical device being capable of splitting the phase modulated optical signal into first and second optical signals, the second optical device being capable of inducing a time delay between the first and second optical signals and providing a combination thereof at said output of said second optical device;
wherein the time delay induced by the second optical device is a fixed, predetermined, unmodulated time delay that is an integer multiple of one-half the period of the optical carrier signal;
wherein, when said first voltage is at a constant value, said output of said second optical device has a null amplitude; and
wherein, when said first voltage is experiencing a change as approximated over an interval equal to said time delay of said second optical device, said output of said second optical device has an active amplitude.

31. The apparatus of claim 30, further comprising:
an information signal input for receiving a binary information signal; and a differential encoder having an input coupled to said information signal input and an output, said output being a binary signal having a finite transition time between levels, said output being coupled to said second input of said first optical device;

whereby said output of said second optical device comprises an RZ-formatted optical signal having a binary pattern equal to the binary pattern of said information signal, each active bit of the RZ-formatted optical signal having a total pulse width approximately equal to a sum of said time delay of said second optical device and said transition time of said output of said differential encoder.

32. The apparatus of claim 30, further comprising:

an information signal input for receiving a binary information signal, said information signal having finite transition times between levels, said information signal input being coupled to said second input of said first optical device, wherein said first voltage is proportional to said information signal;

whereby said output of said second optical device comprises an RZ-formatted optical signal having a binary pattern equal to the binary pattern of said information signal, each active bit of the RZ-formatted optical signal having a total pulse width approximately equal to a sum of said time delay of said second optical device and said transition time of said output of said differential encoder.

33. The apparatus of claim 30, wherein said first optical device comprises a phase modulator.

34. The apparatus of claim 35, wherein said second optical device comprises an interferometer.

35. An apparatus for generating return-to-zero (RZ) optical pulses corresponding to an information signal, comprising:

a differential encoder having an input for receiving the information signal and an output;

a first variable phase changing element having a first input for receiving an optical carrier signal, a second input coupled to the output of said differential encoder, and an output, said first variable phase changing element inducing a phase change that monotonically corresponds to a voltage at said second input;

an optical splitting element having an input coupled to the output of said first variable phase changing element, a first output, and a second output;

an optical combining element having a first input, a second input, and an output;

a first optical path between said first output of said optical splitting element and said first input of said optical combining element, said first optical path inducing a first fixed time delay therebetween;

a second optical path between said second output of said optical splitting element and said second input of said optical combining element, said second optical path inducing a second fixed time delay therebetween, wherein said first and second time delays differ by integer multiple of one-half the period of the optical carrier signal, said output of said optical combining element comprising the RZ optical pulses corresponding to the information signal.

36. The apparatus of claim 35, said RZ optical pulses at said output of said optical combining element having induced frequency shift, said apparatus further comprising:

a second variable phase changing element having a first input coupled to said output of said optical combining element, a second input, and an output, said second variable phase changing element inducing a phase change that monotonically corresponds to a voltage at said second input;

an electrical compensating circuit having an input coupled to the output of said differential encoder and an output coupled to said second input of said second variable phase changing element, said electrical compensating circuit comprising:

an inverter having an input coupled to said differential encoder output, and an output;

an electrical splitting element having an input coupled to the output of said inverter, a first output, and a second output;

an electrical combining element having a first input, a second input, and an output, said output being coupled to said second input of said second variable phase changing element;

a first electrical path between said first output of said electrical splitting element and said first input of said electrical combining element, said first electrical path inducing a third fixed time delay therebetween;

a second electrical path between said second output of said electrical splitting element and said second input of said electrical combining element, said second electrical path inducing a fourth fixed time delay therebetween, wherein said third and fourth time delays differ by an amount approximately equal to said difference between said first and second time delays;

whereby said output of said second variable time delay comprises RZ optical pulses substantially equal to said RZ optical pulses at said output of said optical combining element but with substantially reduced frequency shift.

37. The apparatus of claim 36, wherein said differential encoder, said first variable phase changing element, said optical splitting element, said optical combining element, said first and second optical paths, said second variable phase changing element, and said electrical compensating circuit are integrated onto a common semiconductor substrate.

38. The apparatus of claim 37, further comprising a variable-gain optical element integrated onto said semiconductor substrate.

39. The apparatus of claim 38, said variable-gain optical element comprising a semiconductor optical amplifier having a gain medium that is excited by lasing fields oriented in a direction different than a direction of signal propagation therethrough.

40. The apparatus of claim 35, wherein said first variable phase changing element, said optical splitting element, said optical combining element, and said first and second optical paths are integrated onto a common substrate having a material system selected from the group consisting of: lithium niobate, semiconductor, InP, and GaAs.

41. The apparatus of claim 40, wherein said first variable phase changing element is coupled to said optical splitting element by a folded waveguide structure formed at an edge of said common substrate.

42. An integrated optical circuit for interferometrically redirecting an optical signal from propagation in a first direction on a first waveguide to propagation in a second direction on a second waveguide, the second direction being approximately opposite the first direction, the second waveguide being separated from the first waveguide by less than a minimum bending radius corresponding to a substrate upon which the integrated optical circuit is formed, the integrated optical circuit comprising:
- an optical coupler having an input coupled to the first waveguide, an output coupled to the second waveguide, a first intermediate port, and a second intermediate port;
- a first reflective surface formed on a first edge of the substrate;
- a first interferometer arm coupled between said first intermediate port and said first reflective surface;
- a second reflective surface formed on a second edge of the substrate; and
- a second interferometer arm coupled between said second intermediate port and said second reflective surface;
- wherein said first and second substrate edges are positioned with respect to said optical coupler such that an effective path length of said first interferometer arm differs from an effective path length of said first interferometer arm by a predetermined amount corresponding to a desired interferometric time delay.

43. The integrated optical circuit of claim 42, wherein said first and second substrate edges are substantially parallel to each other.

44. The integrated optical circuit of claim 43, wherein said first and second interferometer arms are substantially parallel to each other and to said first and second waveguides.

45. The integrated optical circuit of claim 44, wherein said first and second interferometer arms are separated by a distance not exceeding said minimum bending radius along their entire lengths.

46. The integrated optical circuit of claim 45, wherein said first and second substrate edges form a step-like indentation along a major edge of the substrate.

47. The integrated optical circuit of claim 45, wherein said substrate is lithium niobate, and wherein said minimum bending radius is approximately 1 cm.

48. The integrated optical circuit of claim 45, further comprising a resistive heating element positioned near said first interferometer arm for allowing fine-tuning of its effective path length.

49. The integrated optical circuit of claim 48, wherein said optical coupler, said first and second interferometer arms, and said first and second reflective surfaces form a Michelson interferometer.

* * * * *